(12) United States Patent
Nakamura et al.

(10) Patent No.: US 10,002,623 B2
(45) Date of Patent: Jun. 19, 2018

(54) SPEECH-PROCESSING APPARATUS AND SPEECH-PROCESSING METHOD

(71) Applicant: HONDA MOTOR CO., LTD., Tokyo (JP)

(72) Inventors: Keisuke Nakamura, Wako (JP); Kazuhiro Nakadai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/223,478

(22) Filed: Jul. 29, 2016

(65) Prior Publication Data
US 2017/0092298 A1 Mar. 30, 2017

(30) Foreign Application Priority Data
Sep. 28, 2015 (JP) .................................. 2015-189438

(51) Int. Cl.
G10L 15/00 (2013.01)
G10L 25/84 (2013.01)
G10L 25/93 (2013.01)
G10K 11/175 (2006.01)
G01S 3/80 (2006.01)
G10L 21/0272 (2013.01)
G10L 15/20 (2006.01)
G10L 25/78 (2013.01)
G10L 25/18 (2013.01)

(52) U.S. Cl.
CPC ............... *G10L 25/84* (2013.01); *G01S 3/80* (2013.01); *G10K 11/175* (2013.01); *G10L 21/0272* (2013.01); *G10L 25/93* (2013.01); *G10L 25/18* (2013.01); *G10L 2025/783* (2013.01)

(58) Field of Classification Search
CPC ..... G10L 25/84; G10L 21/0272; G10L 25/93; G10L 11/175; G10L 25/18; G10L 2025/783; G10K 11/175; G10S 3/80
USPC .................................. 704/226, 233, 235, 246
See application file for complete search history.

(56) References Cited

U.S. PATENT DOCUMENTS

2009/0055170 A1* 2/2009 Nagahama .............. G10L 15/20
704/226

FOREIGN PATENT DOCUMENTS

JP 2001067091 A * 3/2001
JP 2005-227512 8/2005

* cited by examiner

*Primary Examiner* — Thierry L Pham
(74) *Attorney, Agent, or Firm* — Rankin, Hill & Clark LLP

(57) ABSTRACT

A speech-processing apparatus includes: a sound source localization unit that localizes a sound source based on an acquired speech signal; and a speech zone detection unit that performs speech zone detection based on localization information localized by the sound source localization unit.

6 Claims, 16 Drawing Sheets

| GRADIENT TYPE | THRESHOLD VALUE |
|---|---|
| SPEECH START | FIRST GRADIENT THRESHOLD VALUE |
| SPEECH CONTINUATION | SECOND GRADIENT THRESHOLD VALUE |
| SPEECH END | THIRD GRADIENT THRESHOLD VALUE |

SPEECH-PROCESSING APPARATUS AND SPEECH-PROCESSING METHOD

CROSS-REFERENCE TO RELATED APPLICATION

Priority is claimed on Japanese Patent Application No. 2015-189438, filed on Sep. 28, 2015, the contents of which are incorporated herein by reference.

BACKGROUND

Field of the Invention

The present invention relates to a speech-processing apparatus and a speech-processing method.

Background

In the related art, sound source separation techniques have been proposed in which a mixed sound including a plurality of sounds emitted from a plurality of sound sources is separated into a sound of each sound source. As the sound source separation techniques, a technique is known in which a spectrum power of an input sound signal is compared with a predetermined threshold value for each frame and thereby it is determined whether the frame is a speech zone or a non-speech zone. For example, Japanese Unexamined Patent Application, First Publication No. 2005-227512 discloses a speech signal-processing apparatus that detects a speech zone output from a speaker sound source, optimizes a separation matrix when a speech zone is detected, and separates a sound from the speaker sound source and a sound from a noise sound source from a mixed sound by using the optimized separation matrix.

SUMMARY

However, in the speech signal-processing apparatus disclosed in Japanese Unexamined Patent Application, First Publication No. 2005-227512, in a step before a sound from a speaker sound source and a sound from a noise sound source are separated, a speech zone is detected. When a speech recognition process is performed on a sound from a speaker sound source separated by using the technique disclosed in Japanese Unexamined Patent Application, First Publication No. 2005-227512, since a non-speech zone is included in the separated sound from the speaker sound source with respect to a zone as a processing target, there may be a case in which speech recognition accuracy is degraded.

An object of an aspect of the present invention is to provide a speech-processing apparatus and a speech-processing method capable of detecting a zone in which speech recognition accuracy can be improved.

(1) A speech-processing apparatus according to an aspect of the present invention includes: a sound source localization unit that localizes a sound source based on an acquired speech signal; and a speech zone detection unit that performs speech zone detection based on localization information localized by the sound source localization unit.

(2) In the aspect of the above (1), the speech zone detection unit may detect a speech start and a speech end based on localization information localized by the sound source localization unit.

(3) In the aspect of the above (2), the speech zone detection unit may detect a speech zone by using a plurality of threshold values with respect to a speech signal localized by the sound source localization unit.

(4) In the aspect of the above (3), the speech zone detection unit may detect a sound source candidate by using a first threshold value of the plurality of threshold values with respect to a speech signal localized by the sound source localization unit, perform a clustering process on the detected sound source candidate, and detect a speech zone by using a second threshold value that is larger than the first threshold value of the plurality of threshold values for each cluster classified by the clustering process.

(5) In the aspect of the above (3), the speech zone detection unit may detect a sound source candidate by using a second threshold value of the plurality of threshold values with respect to a speech signal localized by the sound source localization unit, perform a clustering process on the detected sound source candidate, and detect a speech zone by using a first threshold value that is smaller than the second threshold value of the plurality of threshold values for each cluster classified by the clustering process.

(6) In the aspect of the above (1) or (2), the speech zone detection unit may perform speech zone detection based on a gradient of a spatial spectrum of a speech signal localized by the sound source localization unit.

(7) In the aspect of the above (1) or (2), the speech-processing apparatus may include a sound source separation unit that performs sound source separation based on the acquired speech signal and a sound source identification unit that performs sound source identification based on a separation signal separated by the sound source separation unit, wherein when the result identified by the sound source identification unit is speech, the speech zone detection unit may detect that speech is continued in a zone.

(8) In the aspect of the above (1) or (2), the speech zone detection unit may detect a sound source candidate by using a threshold value with respect to a speech signal localized by the sound source localization unit, acquire event information indicating that an event which causes noise with respect to the speech signal is occurring, generate a mask for a sound source candidate detected by using the threshold value based on the acquired event information, and detect a speech zone by using the mask generated for the sound source candidate.

(9) A speech-processing method according to another aspect of the present invention includes: (a) localizing, by way of a sound source localization unit, a sound source based on an acquired speech signal; and (b) performing, by way of a speech zone detection unit, speech zone detection based on localization information localized in (a).

According to the configuration of (1) or (9) described above, it is possible to detect a zone in which speech is made with high accuracy by using sound source localization information.

Further, according to the configuration of (2) described above, it is possible to detect a zone in which speech is made with high accuracy by detecting a speech start and a speech end.

Further, according to the configuration of (3) described above, it is possible to reduce an insertion error and discontinuity of a speech zone by using two threshold values sequentially.

Further, according to the configuration of (4) described above, since a clustering process is performed on the detected sound source candidate after detection using a first threshold value, and a speech zone is detected by using a second threshold value for each cluster applied with the clustering process, it is possible to reduce an insertion error and discontinuity of a speech zone when detecting a speech zone.

Further, according to the configuration of (5) described above, since a clustering process is performed on the detected sound source candidate after detection using a second threshold value, and a speech zone is detected by using a first threshold value for each cluster applied with the clustering process, it is possible to reduce an insertion error and discontinuity of a speech zone when detecting a speech zone.

Further, according to the configuration of (6) described above, since a speech zone of the detected sound source candidate is detected by using a gradient of a spatial spectrum after detection using a second threshold value, it is possible to reduce an insertion error and discontinuity of a speech zone when detecting a speech zone.

Further, according to the configuration of (7) described above, by using sound source identification, it is possible to further improve detection accuracy of a speech zone.

Further, according to the configuration of (8) described above, a mask generated based on event information acquired from an external apparatus is applied to a sound source candidate of a spatial spectrum, and thereby, it is possible to detect a speech zone with high accuracy. Further, according to the configuration of (8), it is possible to prevent an insertion error and discontinuity of a speech zone.

DESCRIPTION OF THE EMBODIMENTS

Hereinafter, embodiments of the present invention will be described with reference to the drawings.

[First Embodiment]

Figure 1:
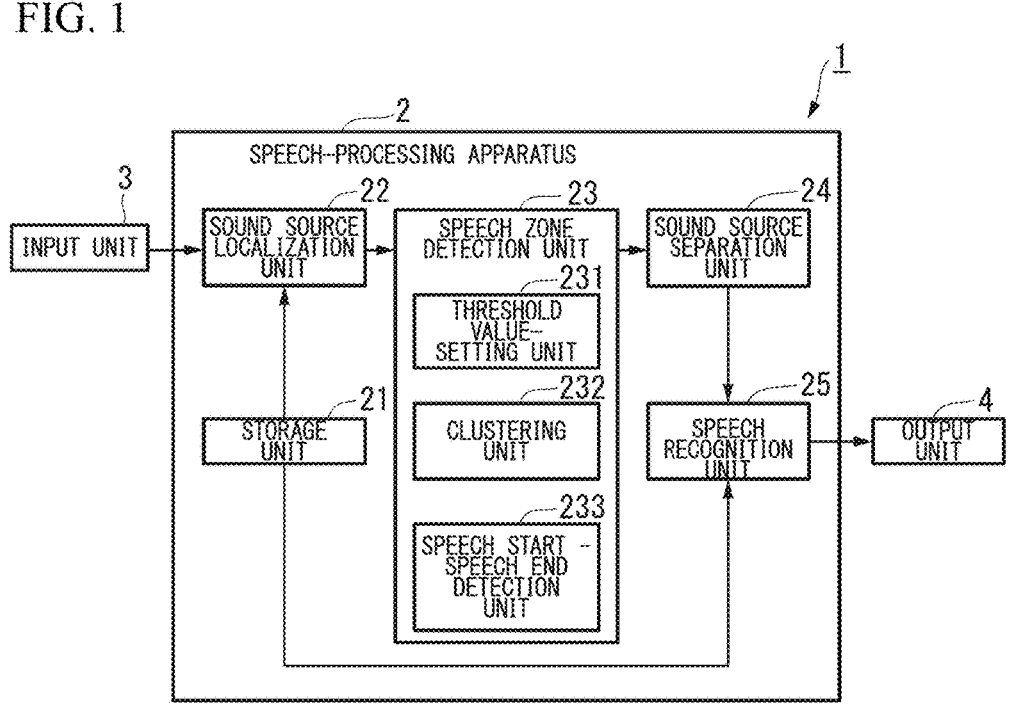
FIG. 1 is a block diagram showing a configuration of a speech-processing system according to a first embodiment.

FIG. 1 is a block diagram showing a configuration of a speech-processing system 1 according to the present embodiment.

As shown in FIG. 1, the speech-processing system 1 includes a speech-processing apparatus 2, an input unit 3, and an output unit 4.

The input unit 3 is, for example, a microphone array in which M electroacoustic conversion elements (microphones) are arranged at different positions. The input unit 3 may be a speech acquisition unit that acquires a recorded M channel speech signal externally. The input unit 3 outputs an input M channel speech signal to the speech-processing apparatus 2. The input unit 3 may transmit the recorded speech signal to the speech-processing apparatus 2 in a wireless manner or in a wired manner.

The position of the input unit 3 may be fixed. Alternatively, the input unit 3 may be provided on a mobile object such as a robot or a vehicle and be movable. The input unit 3 may be integrated with or separate from the speech-processing apparatus 2.

The output unit 4 is, for example, a display device that displays a character, a graphic, an image, and the like. The display device displays information of speech contents represented by speech data in a visible form such as a text or an image. The output unit 4 outputs speech data output by the speech-processing apparatus 2. Note that, the output unit 4 may be a data output interface that outputs speech data to another apparatus.

The output unit 4 may be a data input-output interface configured integrally with the input unit 3.

The speech-processing apparatus 2 includes a storage unit 21, a sound source localization unit 22, a speech zone detection unit 23, a sound source separation unit 24, and a speech recognition unit 25.

The storage unit 21 stores a transfer function of each of sound source directions φ distributed at a predetermined interval (for example, 5°) in advance. Further, the storage unit 21 stores a speech recognition model used at the time of speech recognition by the speech recognition unit 25 in advance. Note that, the speech recognition model includes an acoustic model and a language model. The acoustic model is used for determining a phoneme string that consists of one phoneme or a plurality of phonemes from a speech feature quantity. The acoustic model is, for example, a hidden Markov model (HMM). The language model is used for determining a word configured by a phoneme string. The language model is, for example, an n-gram.

The sound source localization unit 22 determines (sound source localization) the direction of each sound source for each frame having a predetermined length (for example, 50 ms) based on the M channel speech signal output by the input unit 3. In the sound source localization, the sound source localization unit 22 calculates a spatial spectrum indicating a power of each direction by using a transfer function stored in the storage unit 21, for example, using a multiple signal classification (MUSIC) method. Note that, the sound source localization unit 22 may use, for example, a weighted delay and sum beam forming (WDS-BF) method and the like instead of the MUSIC method. The sound source localization unit 22 determines a sound source direction of each sound source based on the spatial spectrum. Note that, the sound source localization is described below. The sound source localization unit 22 outputs the M channel speech signal and sound source direction information indicating the determined sound source direction of each sound source to the speech zone detection unit 23.

The speech zone detection unit 23 includes a threshold value-setting unit 231, a clustering unit 232, and a speech start-speech end detection unit 233.

The sound source direction information and the M channel speech signal output by the sound source localization unit 22 is input to the speech zone detection unit 23. The speech zone detection unit 23 detects a sound source candidate by using a first threshold value $T_L$ set by the threshold value-setting unit 231. The speech zone detection unit 23 detects a speech zone by using a speech start and a speech end detected by the speech start-speech end detection unit 233 by using a second threshold value $T_H$ set by the threshold value-setting unit 231 with respect to a sound source candidate applied with a clustering process by the clustering unit 232. Note that, speech zone detection is described below. The speech zone detection unit 23 extracts sound source direction information in the detected speech zone from the input sound source direction information and extracts an M channel speech signal in the detected speech zone from the input M channel speech signal. The speech zone detection unit 23 outputs the extracted sound source direction information φk(f) in the speech zone and the extracted M channel speech signal in the speech zone to the sound source separation unit 24. Note that, f represents a frame, and k represents the number of sound sources.

The sound source direction information and the M channel speech signal output by the speech zone detection unit 23 is input to the sound source separation unit 24. The sound source separation unit 24 separates the M channel speech signal into sound source-specific speech signals as a speech signal of each sound source based on the sound source directions indicated by the sound source direction information. When the sound source separation unit 24 separates the M channel speech signal into sound source-specific speech signals, for example, the sound source separation unit 24 uses a geometric-constrained high-order decorrelation-based source separation (GHDSS) method. The sound source separation unit 24 outputs the separated speech signal of each separated sound source, that is, the separated speech signal in the direction of the azimuth angle $φ_k(f)$ to the speech recognition unit 25. Note that, the present embodiment is described using an example in which sound sources detected as the same angle represent the same sound source.

The speech recognition unit 25 calculates a speech feature quantity of the separated speech signal of the frame output by the sound source separation unit 24. The speech recognition unit 25 performs a speech recognition process by using the calculated speech feature quantity and a speech recognition model stored in the storage unit 21. The speech recognition unit 25 determines a word having the highest likelihood calculated by using the speech recognition model as a recognition result for the calculated speech feature quantity. The speech recognition unit 25 outputs text data representing the recognition result as the speech contents of each sound source to the output unit 4.

<Sound Source Localization>

Next, the MUSIC method, which is one method of sound source localization, will be described.

The MUSIC method is a method for determining a sound source direction φ at which a power $P_{ext}(φ)$ of a spatial spectrum described below is a local maximum and is higher than a predetermined level. The sound source localization unit 22 generates a transfer function vector [D(φ)] having transfer functions $D_{[m]}(ω)$ from a sound source to a microphone corresponding to each of channels m (where m is an integer equal to or greater than 1 and equal to or less than M) as elements for each sound source direction φ.

The sound source localization unit 22 converts an acoustic signal $x_p(t)$ (t represents time) of each channel p to a frequency domain for each frame having a predetermined number of samples to thereby calculate a conversion coefficient $x_p(ω)$. The sound source localization unit 22 calculates an input correlation matrix $[R_{xx}]$ shown in Expression (1) from an input vector [x(ω)] including the calculated conversion coefficient as elements.

$$[R_{xx}] = E[[x(ω)][x(ω)]^*] \quad (1)$$

In Expression (1), E[ . . . ] indicates an expected value of . . . . [ . . . ]* indicates a conjugate transpose of a matrix or a vector.

The sound source localization unit 22 calculates an eigenvalue $δ_i$ and an eigenvector $[e_i]$ of the input correlation matrix $[R_{xx}]$. The input correlation matrix $[R_{xx}]$, the eigenvalue $δ_i$, and the eigenvector $[e_i]$ have a relationship shown in Expression (2).

$$[R_{xx}][e_i] = δ_i[e_i] \quad (2)$$

In Expression (2), i is an integer equal to or greater than 1 and equal to or less than M. The order of the index i is a descending order of the eigenvalue $δ_i$.

The sound source localization unit 22 calculates a power P(φ) of a frequency-specific spatial spectrum shown in Expression (3) based on the transfer function vector [D(φ)] and the calculated eigenvector $[e_i]$.

$$P(φ) = \frac{|[D(φ)] * [D(φ)]|}{\sum_{i=K+1}^{M} |[D(φ)] * [e_i]|} \quad (3)$$

In Expression (3), K is a maximum number of detectable sound sources (for example, 2). K is a natural number determined in advance to be less than M.

The sound source localization unit 22 calculates the total sum of the spatial spectrum P(φ) as a power Pext(φ) of the spatial spectrum in the entire band to estimate the sound source direction.

The sound source localization unit 22 calculates the spatial spectrum P(φ) of the estimated sound source direction for each frame f and outputs the calculated spatial spectrum P(φ,f) for each frame f as sound source direction information to the speech zone detection unit 23.

<Speech Zone Detection>

Next, speech zone detection will be described.

Figure 2:
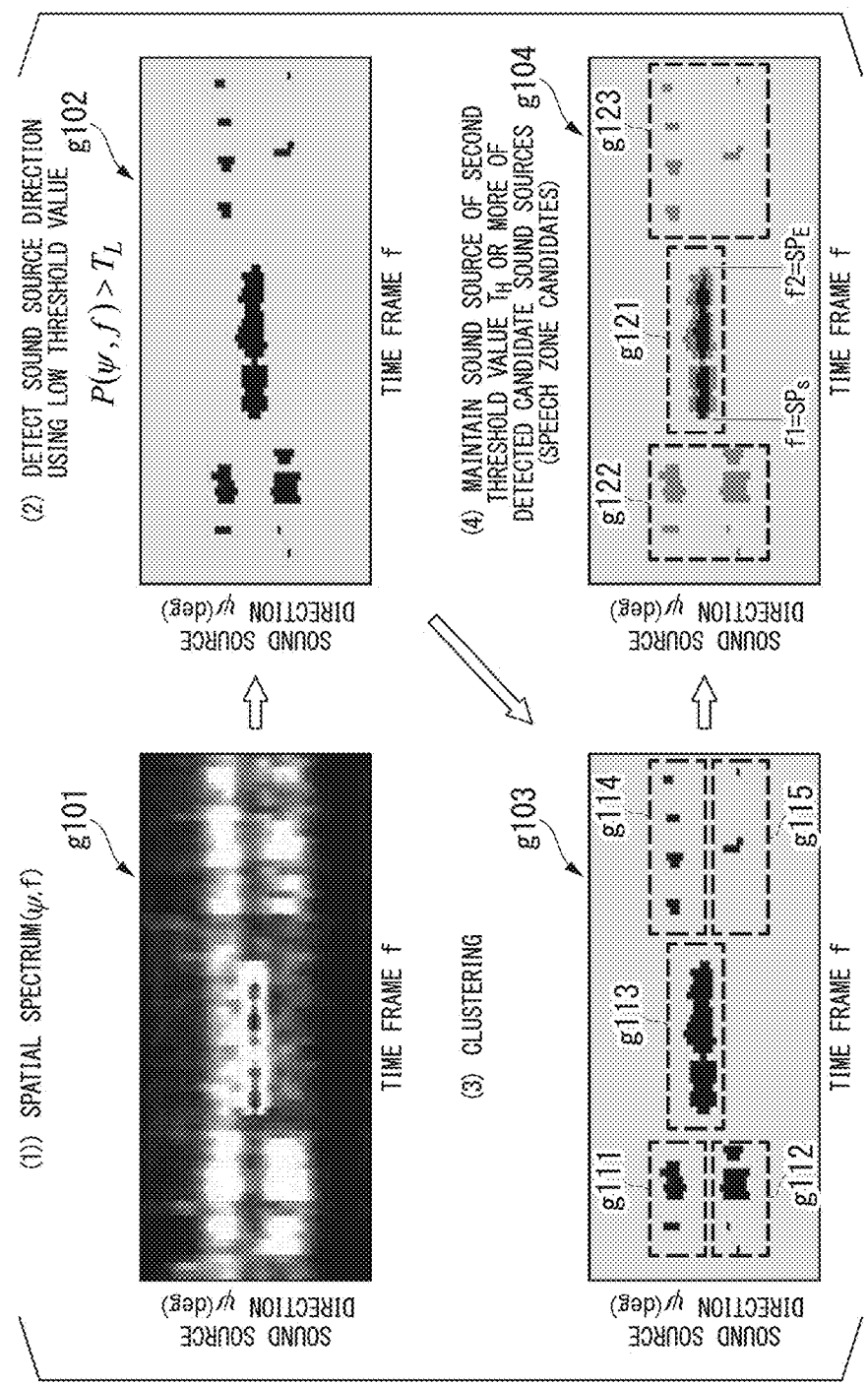
FIG. 2 is a view showing a speech zone detection method according to the first embodiment.

FIG. 2 is a view showing a speech zone detection method according to the present embodiment. In FIG. 2, the vertical axis represents sound source direction φ [deg], and the horizontal axis represents time frame f.

Image g101 of FIG. 2 is an image showing an example of a spatial spectrum P(φ,f).

First, the threshold value-setting unit 231 sets a threshold value for detecting a speech zone to a first threshold value $T_L$. Next, as shown in image g102 of FIG. 2, the speech zone detection unit 23 detects a sound source candidate of which the power of the spatial spectrum is higher than a predetermined power threshold value for each sound source with respect to sound source directions indicated by the sound source direction information by using the first threshold value $T_L$ set by the threshold value-setting unit 231. Image g102 of FIG. 2 is an image showing an example of a sound source candidate detected by using the first threshold value $T_L$.

Next, as shown in image g103 of FIG. 2, the clustering unit 232 classifies the sound source candidate into clusters, for example, by using a hierarchical clustering method (a nearest neighbor method, a furthest neighbor method, a group average method, a Ward method), a partitioning-optimization clustering method, and the like. Image g103 of FIG. 2 is an image showing an example of a result obtained by a clustering process of the sound source candidate. In image g103, each of regions gill to g115 surrounded by a chain line is a cluster classified as one cluster.

Next, the threshold value-setting unit 231 sets a threshold value for detecting a speech zone to a second threshold value $T_H$ that is larger than the first threshold value $T_L$. Next, the speech zone detection unit 23 determines whether or not a component having the second threshold value $T_H$ or more is included in each cluster. As shown in image g104 of FIG. 2, the speech zone detection unit 23 detects a cluster including a component having the second threshold value $T_H$ or more as a speech zone. Image g104 of FIG. 2 is an image showing an example of a sound source candidate having the second threshold value $T_H$ or more of sound source candidates. Note that, the speech zone detection unit 23 detects a cluster including one or more components having the second threshold value $T_H$ or more as a speech zone. Alternatively, the speech zone detection unit 23 may detect a cluster including a predetermined rate or more components having the second threshold value $T_H$ or more as a speech zone. In image g104, a region g121 surrounded by a chain line is a region detected as a sound source, that is, a region detected as a speech zone, since a component having the second threshold value $T_H$ or more is included. Further, in image g104, a region g122 and a region g123 surrounded by a chain line are regions that are not detected as a sound source, that is, rejected regions, since a component having the second threshold value $T_H$ or more is not included. Further, the speech start-speech end detection unit 233 detects a frame f1 having the lowest value as a speech start $SP_S$ and detects a frame f2 having the highest value as a speech end $SP_E$ in the cluster including a component having the second threshold value $T_H$ or more. The speech zone detection unit 23 detects a zone between the speech start $SP_S$ and the speech end $SP_E$ detected by the speech start-speech end detection unit 233 as a speech zone.

Here, an advantage obtained by using two different threshold values sequentially is described.

Figure 3:
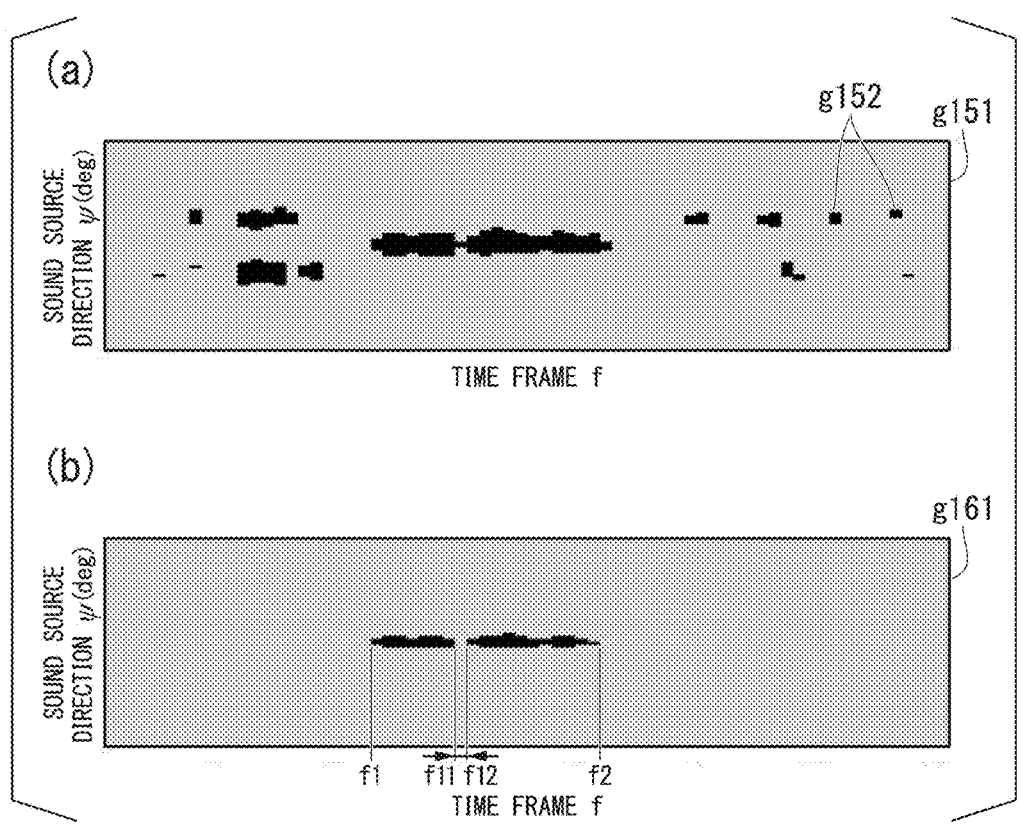
FIG. 3 is a view showing an example of an insertion error and discontinuity of a speech zone.

FIG. 3 is a view showing an example of an insertion error and discontinuity of a speech zone. In FIG. 3, the vertical axis represents sound source direction φ [deg], and the horizontal axis represents time frame f. Image g151 is an image of an example of sound source candidates detected by using a lower threshold value. Image g161 is an image of an example of sound source candidates detected by using a higher threshold value.

When a speech zone is detected by using only a lower threshold value, as shown in image g151 of FIG. 3, noise is also determined as a sound source, and an insertion error occurs. In image g151, a reference numeral g152 is an example of an insertion error.

Further, when a speech zone is detected by using only a higher threshold value, as shown in image g161 of FIG. 3, a phenomenon occurs in which a discontinued speech zone is detected. In image g161, a zone between frames f11 and f12 is an example of discontinuity. In this case, the speech zone is not continuous between frames f1 and f2 and is detected as two zones that are a zone between frames f1 and f11 and a zone between frames f12 and f2.

According to the present embodiment, first, a sound source candidate is detected by using the first threshold value $T_L$, and therefore, it is possible to reduce discontinuity of a speech zone. Further, according to the present embodiment, a clustering process is performed on the sound source candidate, and the second threshold value $T_H$ is used for each cluster. Thereby, it is possible to remove an insertion error. Note that, since the component included in the cluster is a component having the first threshold value $T_L$ or more even when the second threshold value $T_H$ is used, it is possible to reduce discontinuity of a speech zone.

<Sound Source Separation>

Next, the GHDSS method, which is one method of sound source separation, will be described.

The GHDSS method is a method which adaptively calculates a separation matrix $[V(\omega)]$ such that a separation sharpness $J_{SS}([V(\omega)])$ and a geometric constraint $J_{GC}([V(\omega)])$ as two cost functions are decreased. The separation matrix $[V(\omega)]$ is a matrix which is used in order to calculate speech signals (estimated value vector) $[u'(\omega)]$ of each sound source of K channels by multiplying the speech signal $[x(\omega)]$ of the P channels input from the sound source localization unit 22. Here, $[\ldots]^T$ indicates a transpose of a matrix or a vector.

The separation sharpness $J_{SS}([V(\omega)])$ is represented as Expression (4). The geometric constraint $J_{GC}([V(\omega)])$ is represented as Expression (5).

$$J_{SS}([V(\omega)]) = \|\phi([u'(\omega)])[u'(\omega)]^* - \text{diag}[\phi([u'(\omega)])[u'(\omega)]^*]\|^2 \quad (4)$$

$$J_{GC}([V(\omega)]) = \|\text{diag}[[V(\omega)][D(\omega)] - [I]]\|^2 \quad (5)$$

In Expressions (4) and (5), $\|\ldots\|^2$ is a Frobenius norm of a matrix . . . . The Frobenius norm is a square sum (scalar value) of element values constituting a matrix. $\phi([u'(\omega)])$ is a nonlinear function of the speech signal $[u'(\omega)]$, for example, a hyperbolic tangent function. The diag[ . . . ] indicates the total sum of diagonal components of a matrix . . . . Accordingly, the separation sharpness $J_{SS}([V(\omega)])$ is an index value representing the magnitude of a non-diagonal component between channels of the spectrum of the speech signal (estimated value), that is, the degree of erroneous separation of a certain sound source as a different sound source. Further, in Expression (5), [I] indicates a unit matrix. Accordingly, the geometric constraint $J_{GC}([V(\omega)])$ is an index value which represents the degree of error between the spectrum of the speech signal (estimated value) and the spectrum of the speech signal (sound source).

<Process Sequence of Speech-Processing System 1>

Next, a process sequence performed by the speech-processing system 1 will be described.

Figure 4:
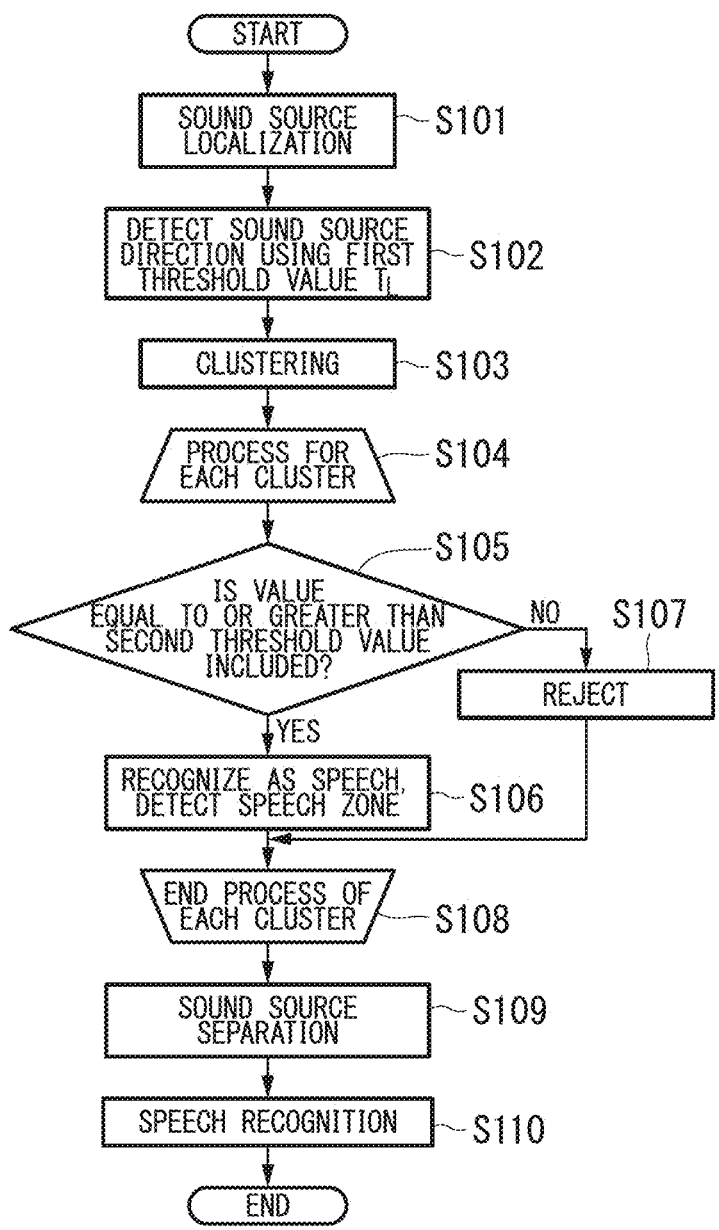
FIG. 4 is a flowchart of a process performed by the speech-processing system according to the first embodiment.

FIG. 4 is a flowchart of a process performed by the speech-processing system 1 according to the present embodiment.

(Step S101) The sound source localization unit 22 calculates a spatial spectrum that indicates a power for each direction based on the M channel speech signal from the input unit 3. Subsequently, the sound source localization unit 22 determines the sound source direction of each sound source based on the calculated spatial spectrum.

(Step S102) The threshold value-setting unit 231 sets a threshold value for detecting a speech zone to a first threshold value $T_L$. Subsequently, the speech zone detection unit 23 detects a sound source candidate of which the power of the spatial spectrum is higher than a predetermined power threshold value for each sound source with respect to sound source directions indicated by the sound source direction information by using the first threshold value $T_L$ set by the threshold value-setting unit 231.

(Step S103) The clustering unit 232 classifies the sound source candidate into clusters, for example, by using a hierarchical clustering method, a partitioning-optimization clustering method, and the like.

(Step S104) The speech zone detection unit 23 performs the processes of steps S104 to S108 for each cluster. The speech zone detection unit 23 selects one of the clusters classified in step S103.

(Step S105) The threshold value-setting unit 231 sets a threshold value for detecting a speech zone to a second threshold value $T_H$ that is larger than the first threshold value $T_L$. Subsequently, the speech zone detection unit 23 determines whether or not a component having the second threshold value $T_H$ or more is included. When the speech zone detection unit 23 determines that a component having the second threshold value $T_H$ or more is included (step S105; YES), the speech zone detection unit 23 advances the process to step S106. When the speech zone detection unit 23 determines that a component having the second threshold value $T_H$ or more is not included (step S105; NO), the speech zone detection unit 23 advances the process to step S107.

(Step S106) The speech zone detection unit 23 detects a cluster including a component having the second threshold value $T_H$ or more as speech. Subsequently, the speech start-speech end detection unit 233 detects a frame having the smallest value as a speech start $SP_S$ and detects a frame f having the largest value as a speech end $SP_E$ in the cluster including a component having the second threshold value $T_H$ or more. Subsequently, the speech zone detection unit 23 detects the zone between the detected speech start $SP_S$ and the detected speech end $SP_E$ as a speech zone. The speech zone detection unit 23 advances the process to step S108.

(Step S107) The speech zone detection unit 23 rejects a cluster that does not include a component having the second threshold value $T_H$ or more and advances the process to step S108.

(Step S108) When all the clusters classified in step S103 have already been extracted in step S104, the speech zone detection unit 23 ends the process of each cluster and advances the process to step S109.

(Step S109) The sound source separation unit 24 separates the M channel speech signal into sound source-specific speech signals as a speech signal of each sound source based on the sound source directions indicated by the sound source direction information.

(Step S110) The speech recognition unit 25 calculates a speech feature quantity of the separated speech signal of the frame output by the sound source separation unit 24. Subsequently, the speech recognition unit 25 performs a speech recognition process by using the calculated speech feature quantity and a speech recognition model stored in the storage unit 21. Subsequently, the speech recognition unit 25 determines a word having the highest likelihood calculated by using the speech recognition model for the calculated speech feature quantity as a recognition result.

Thus, the process performed by the speech-processing system 1 is completed.

As described above, the speech-processing apparatus 2 of the present embodiment includes: the sound source localization unit 22 that localizes a sound source based on an acquired speech signal and the speech zone detection unit 23 that performs speech zone detection based on localization information localized by the sound source localization unit 22.

According to this configuration, it is possible to detect a zone in which speech is made with high accuracy by using sound source localization information.

Further, in the speech-processing apparatus 2 of the present embodiment, the speech zone detection unit 23 detects a speech start (for example, the frame f1 of FIG. 2) and a speech end (for example, the frame f2 of FIG. 2) based on localization information localized by the sound source localization unit 22.

According to this configuration, it is possible to detect a zone in which speech is made with high accuracy by detecting a speech start and a speech end.

Further, in the speech-processing apparatus 2 of the present embodiment, the speech zone detection unit 23 detects a speech zone by using a plurality of threshold values (for example, the first threshold value $T_L$, the second threshold value $T_H$) with respect to a speech signal localized by the sound source localization unit 22.

According to this configuration, detection is performed twice with respect to the information applied with sound source localization by using the first threshold value $T_L$ and the second threshold value $T_H$ in the ascending order, and thereby, it is possible to detect a speech zone with good accuracy.

According to the present embodiment, it is possible to reduce an insertion error and discontinuity of a speech zone by using two threshold values sequentially.

Further, in the speech-processing apparatus 2 of the present embodiment, the speech zone detection unit 23 detects a sound source candidate by using the first threshold value $T_L$ of the plurality of threshold values with respect to a speech signal localized by the sound source localization unit 22, performs a clustering process on the detected sound source candidate, and detects a speech zone by using the second threshold value $T_H$ that is larger than the first threshold value $T_L$ of the plurality of threshold values for each cluster classified by the clustering process.

According to this configuration, since a clustering process is performed on the detected sound source candidate after detection using the first threshold value $T_L$, and a speech zone is detected by using the second threshold value $T_H$ for each cluster applied with the clustering process, it is possible to reduce an insertion error and discontinuity of a speech zone when detecting a speech zone.

[Second Embodiment]

The first embodiment is described using an example in which after detection using the first threshold value $T_L$ as a lower value, a speech zone is detected by using the second threshold value $T_H$ as a higher value than the first threshold value $T_L$. On the other hand, the present embodiment is described using an example in which after detection using the second threshold value $T_H$, a speech zone is detected by using the first threshold value $T_L$.

The configuration of the speech-processing system 1 of the present embodiment is the same as the configuration of the first embodiment shown in FIG. 1. The difference from the first embodiment is a process of the speech zone detection unit 23 of the speech-processing apparatus 2.

The speech zone detection unit 23 detects a sound source candidate by using a second threshold value $T_H$ set by the threshold value-setting unit 231. The speech zone detection unit 23 detects a speech zone by using a speech start and a speech end detected by the speech start-speech end detection unit 233 by using a first threshold value $T_L$ set by the threshold value-setting unit 231 with respect to a sound source candidate applied with a clustering process by the clustering unit 232. The speech zone detection unit 23 extracts sound source direction information in the detected speech zone from the input sound source direction information and extracts an M channel speech signal in the detected speech zone from the input M channel speech signal. The speech zone detection unit 23 outputs the extracted sound source direction information φk(f) in the speech zone and the extracted M channel speech signal in the speech zone to the sound source separation unit 24.

<Speech Zone Detection>

Next, speech zone detection will be described.

Figure 5:
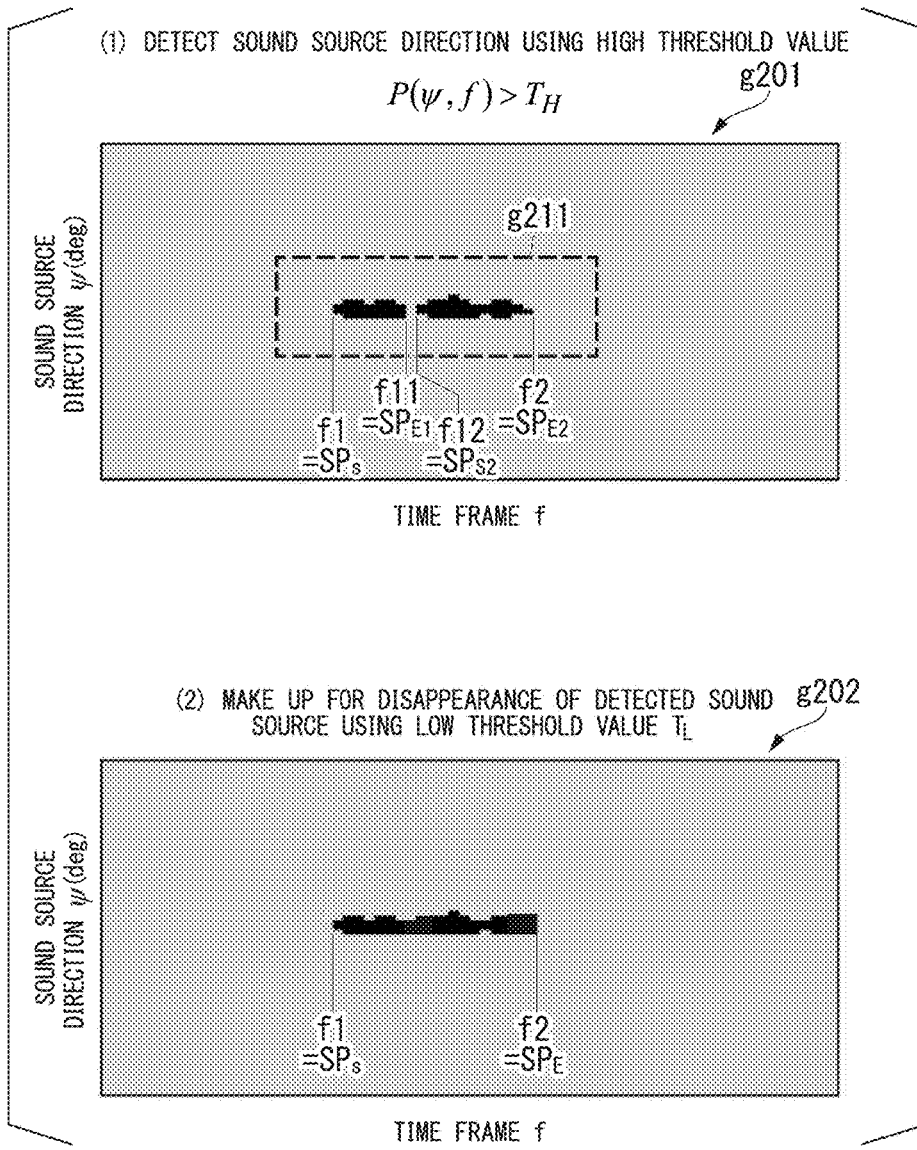
FIG. 5 is a view showing a speech zone detection method according to a second embodiment.

FIG. 5 is a view showing a speech zone detection method according to the present embodiment. In FIG. 5, the vertical axis represents sound source direction φ [deg], and the horizontal axis represents time frame f.

First, the threshold value-setting unit 231 sets a threshold value for detecting a speech zone to a second threshold value $T_H$. Next, as shown in image g201 of FIG. 5, the speech zone detection unit 23 detects a sound source candidate of which the power of the spatial spectrum is higher than a predetermined power threshold value for each sound source with respect to sound source directions indicated by the sound source direction information by using the second threshold value $T_H$ set by the threshold value-setting unit 231. Image g201 of FIG. 5 is an image showing an example of a sound source candidate detected by using the second threshold value $T_H$. In this case, as shown in image g201, discontinuity of a speech zone occurs between frames f11 and f12.

Next, the clustering unit 232 classifies the sound source candidate into clusters, for example, by using a hierarchical clustering method, a partitioning-optimization clustering method, and the like, as shown in a region g211 surrounded by a chain line in image g201. The region g211 surrounded by a chain line is a cluster classified as one cluster.

Next, the threshold value-setting unit 231 sets a threshold value for detecting a speech zone to a first threshold value $T_L$ that is smaller than the second threshold value $T_H$. Next, when the sound source candidate is classified into a plurality of clusters, the speech zone detection unit 23 detects again a component having the first threshold value $T_L$ or more for each cluster. As shown in image g202 of FIG. 5, the speech zone detection unit 23 detects a cluster including a component having the first threshold value $T_L$ or more as a speech zone. Further, similarly to the first embodiment, the speech start-speech end detection unit 233 detects a frame f1 having the lowest value as a speech start $SP_S$ and detects a frame f2 having the highest value as a speech end $SP_E$ in the cluster including a component having the second threshold value $T_H$ or more. The speech zone detection unit 23 detects a zone between the speech start $SP_S$ and the speech end $SP_E$ detected by the speech start-speech end detection unit 233 as a speech zone.

<Process Sequence of Speech-Processing System 1>

Next, a process sequence performed by the speech-processing system 1 of the present embodiment will be described.

Figure 6:
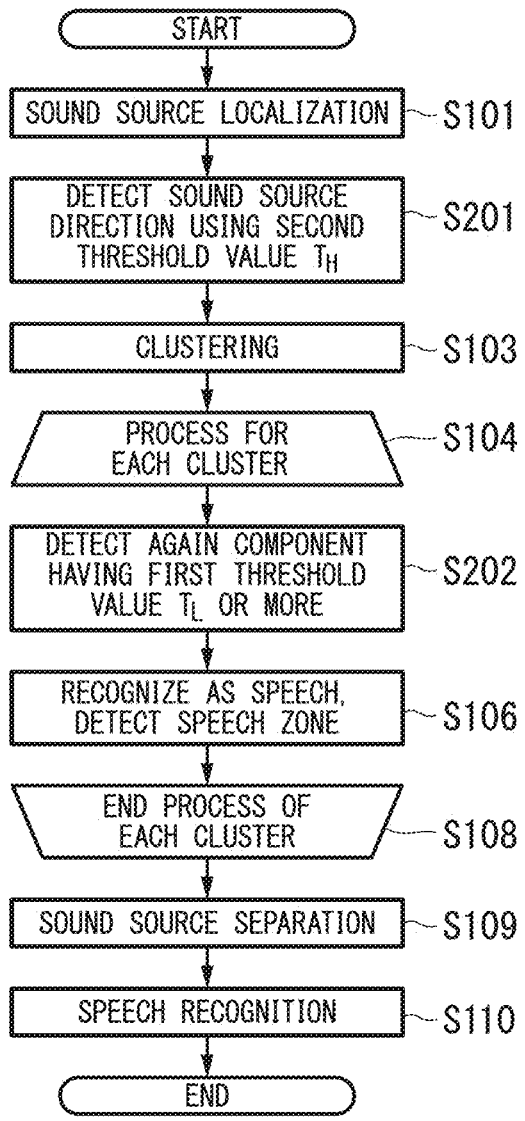
FIG. 6 is a flowchart of a process performed by a speech-processing system according to the second embodiment.

FIG. 6 is a flowchart of a process performed by the speech-processing system 1 according to the present embodiment. Note that, the same reference numeral is used for the same process as that of the first embodiment shown in FIG. 4, and the description thereof is omitted.

(Step S201) After the process of step S101 (FIG. 4) is completed, the threshold value-setting unit 231 sets a threshold value for detecting a speech zone to a second threshold value $T_H$. Subsequently, the speech zone detection unit 23 detects a sound source candidate of which the power of the spatial spectrum is higher than a predetermined power threshold value for each sound source with respect to sound source directions indicated by the sound source direction information by using the second threshold value $T_H$ set by the threshold value-setting unit 231. The threshold value-setting unit 231 advances the process to step S103.

(Step S202) The threshold value-setting unit 231 performs a process of step S202 instead of the process of step S105 (FIG. 4). The threshold value-setting unit 231 sets a threshold value for detecting a speech zone to a first threshold value $T_L$ that is smaller than the second threshold value $T_H$. Subsequently, the speech zone detection unit 23 detects again a component having the first threshold value $T_L$ or more for each cluster. The threshold value-setting unit 231 advances the process to step S106.

(Step S106) The speech zone detection unit 23 detects a cluster including a component having the first threshold value $T_L$ or more as speech in the cluster selected in step S104. Subsequently, the speech start-speech end detection unit 233 detects a frame having the smallest value as a speech start $SP_S$ and detects a frame f having the largest value as a speech end $SP_E$ in the cluster including a component having the first threshold value $T_L$ or more. Subsequently, the speech zone detection unit 23 detects the zone between the detected speech start $SP_S$ and the detected speech end $SP_E$ as a speech zone. The speech zone detection unit 23 advances the process to step S108.

Thus, the process performed by the speech-processing system 1 is completed.

As described above, in the speech-processing apparatus 2 of the present embodiment, the speech zone detection unit 23 detects a sound source candidate by using the second threshold value $T_H$ of the plurality of threshold values with respect to a speech signal localized by the sound source localization unit 22, performs a clustering process on the detected sound source candidate, and detects a speech zone by using the first threshold value $T_L$ that is smaller than the second threshold value $T_H$ of the plurality of threshold values for each cluster classified by the clustering process.

According to this configuration, since a clustering process is performed on the detected sound source candidate after detection using the second threshold value $T_H$, and a speech zone is detected by using the first threshold value $T_L$ for each cluster applied with the clustering process, it is possible to reduce an insertion error and discontinuity of a speech zone when detecting a speech zone.

Note that, the present embodiment is described using an example in which the speech zone detection unit 23 includes the clustering unit 232 similarly to the first embodiment; however, the embodiment is not limited thereto. The speech zone detection unit 23 may not include the clustering unit 232. In this case, the speech zone detection unit 23 detects a speech start and a speech end with respect to a sound source candidate detected by using the second threshold value $T_H$. For example, in image g201 of FIG. 5, the speech zone detection unit 23 detects the frame 11 as a first speech end $SP_{E1}$ and detects the frame 12 as a second speech start $SP_{S2}$. Then, when the number of frames of a zone between the detected first speech end $SP_{E1}$ and the detected second speech start $SP_{S2}$ is a predetermined value or less, the speech zone detection unit 23 may detect again a sound source candidate by using the first threshold value $T_L$ only with respect to a component of a zone between the first speech end $SP_{E1}$ and the second speech start $SP_{S2}$ or with respect to a component of a zone between the first speech start $SP_{S1}$ and the second speech end $SP_{E2}$.

Note that, the first embodiment and the second embodiment are described using an example in which two threshold values are used; however, the number of threshold values may be three or more. Here, it is assumed that three threshold values are a threshold value $T_{th1}$, a threshold value $T_{th2}$, and a threshold value $T_{th3}$. The magnitude relationship between threshold values is assumed such that the threshold value $T_{th3}$ is the largest value, the threshold value $T_{th2}$ is larger than the threshold value $T_{th1}$, and the threshold value $T_{th1}$ is the smallest value. In the first embodiment, first, the threshold value $T_{th1}$, which is the smallest value, may be used, and then, any one of the threshold value $T_{th2}$ and the threshold value $T_{th3}$ may be used. In the second embodiment, first, the threshold value $T_{th3}$, which is the largest value, may be used, and then, any one of the threshold value $T_{th1}$ and the threshold value $T_{th2}$ may be used.

[Third Embodiment]

The third embodiment is described using an example in which after detecting a sound source candidate by using the second threshold value $T_H$ with respect to the information applied with sound source localization similarly to the second embodiment, discontinuity of a speech zone is prevented based on a gradient.

Figures 7, 8:
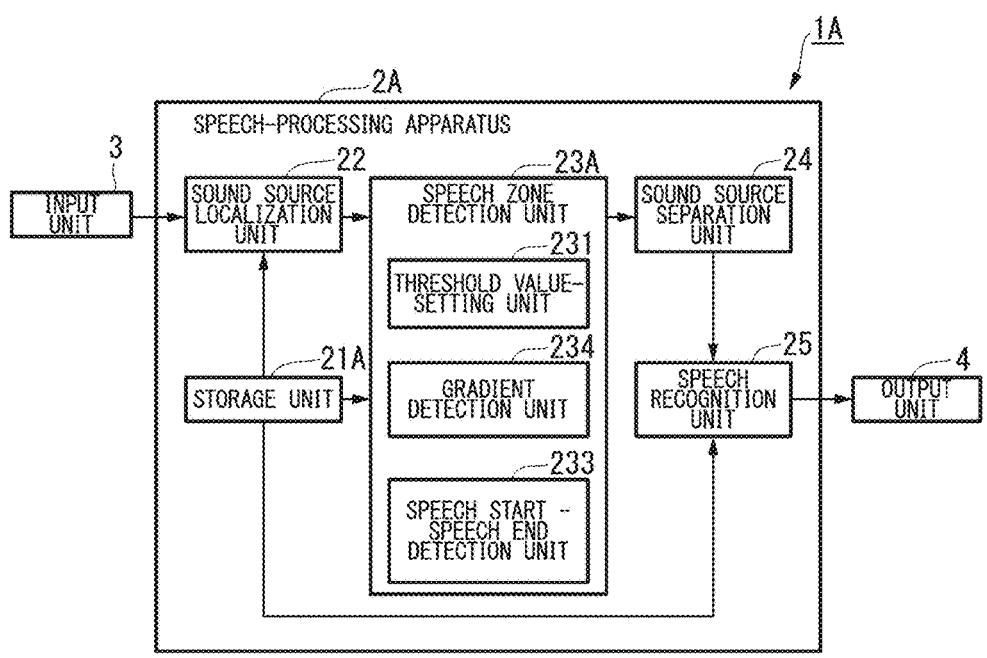
FIG. 7 is a block diagram showing a configuration of a speech-processing system according to a third embodiment.
FIG. 8 is a view showing an example of a threshold value with respect to a gradient stored in a storage unit according to the third embodiment.

FIG. 7 is a block diagram showing a configuration of a speech-processing system 1A according to the present embodiment. Note that, the same reference numeral is used for a function unit having the same function as the speech-processing system 1, and the description thereof is omitted. The difference of the speech-processing system 1A from the speech-processing system 1 is a storage unit 21A and a speech zone detection unit 23A of a speech-processing apparatus 2A.

The storage unit 21A stores a threshold value for determining a speech start, a threshold value for determining a speech end (sound source disappearance), and a threshold value for determining a speech continuation (sound source continuation) as shown in FIG. 8, in addition to the information stored in the storage unit 21. FIG. 8 is a view showing an example of a threshold value with respect to a gradient stored in the storage unit 21A according to the present embodiment. As shown in FIG. 8, the storage unit 21A stores a first gradient threshold value for determining a speech start, a second gradient threshold value for determining a speech continuation, and a third gradient threshold value for determining a speech end. Note that, the second threshold value is a value including a predetermined range.

The speech zone detection unit 23A includes a threshold value-setting unit 231, a speech start-speech end detection unit 233, and a gradient detection unit 234.

The speech zone detection unit 23A detects a sound source candidate by using a second threshold value $T_H$ set by the threshold value-setting unit 231. The speech start-speech end detection unit 233 detects a speech zone based on a gradient of a spatial spectrum detected by the gradient detection unit 234. Note that, speech zone detection is described below. The speech zone detection unit 23A extracts sound source direction information in the detected speech zone from the input sound source direction information and extracts an M channel speech signal in the detected speech zone from the input M channel speech signal. The speech zone detection unit 23A outputs the extracted sound source direction information φk(f) in the speech zone and the extracted M channel speech signal in the speech zone to the sound source separation unit 24.

<Speech Zone Detection>

Next, speech zone detection will be described.

As described in the second embodiment, when a sound source candidate is detected by using the second threshold value $T_H$ first, there may be a case in which discontinuity of a speech zone occurs as shown in image g201 of FIG. 5.

Figure 9:
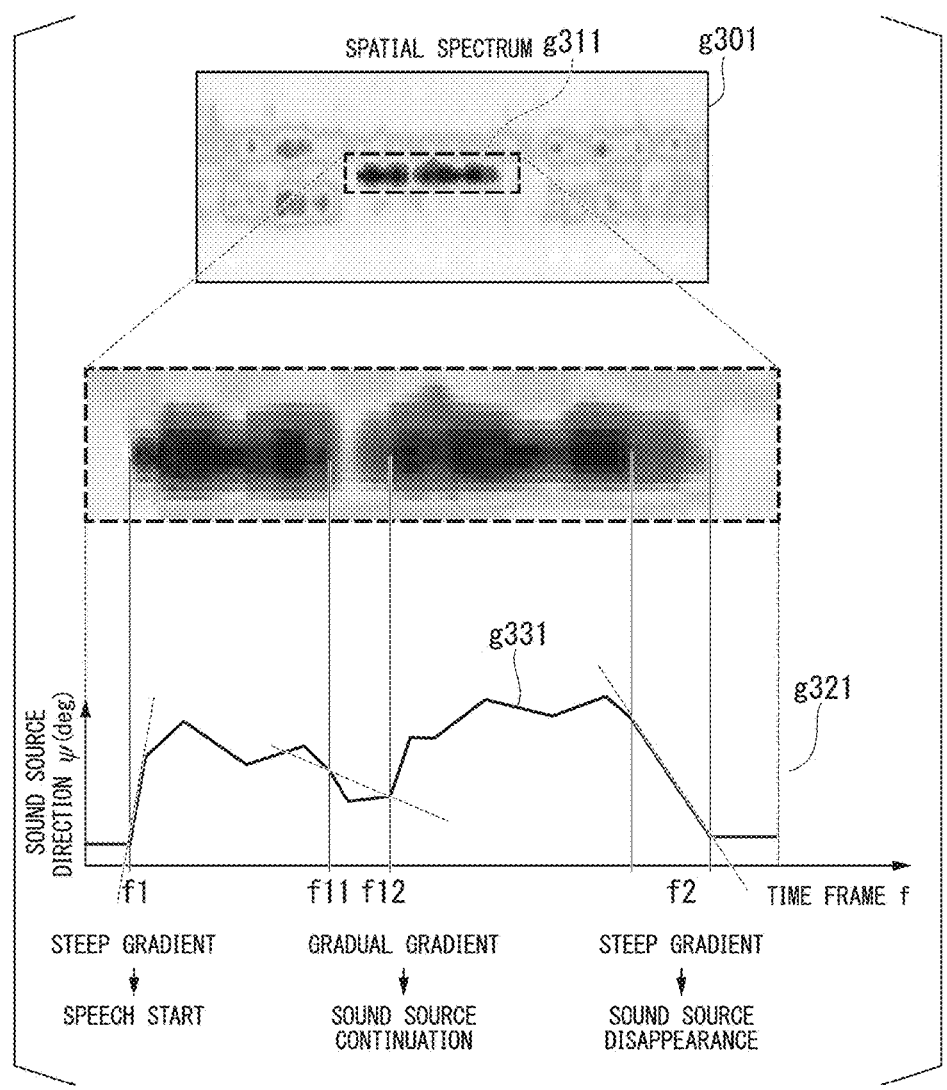
FIG. 9 is a view showing an example of a gradient of a spatial spectrum.

FIG. 9 is a view showing an example of a gradient of a spatial spectrum. In FIG. 9, the vertical axis represents sound source direction φ [deg], and the horizontal axis represents time frame f. Further, image g301 is an example of a spatial spectrum calculated by the sound source localization unit 22. Further, in image g301, a region surrounded by a chain line g311 represents a sound source candidate detected by using the second threshold value $T_H$.

In FIG. 9, image g321 is an enlarged view of a spatial spectrum of a sound source candidate detected by using the second threshold value $T_H$. In image g321, a waveform g331 represents a change in a sound source direction φ with respect to a time frame f. As shown in the waveform g331, the gradient (slope) at a speech start is a positive steep gradient, the gradient (slope) at a speech continuation (sound source continuation) is a negative gradual gradient, and the gradient at a speech end (sound source disappearance) is a negative steep gradient.

The gradient detection unit 234 detects a gradient in a zone including a sound source candidate detected by using the second threshold value $T_H$ and outputs the value of the detected gradient to the speech start-speech end detection unit 233. Note that, the gradient detection unit 234 detects a gradient from a frame before the frame f1 (FIG. 5) detected to have the second threshold value $T_H$ or more in order to detect a speech start and detects a gradient to a frame after the frame f2 (FIG. 5) detected to have the second threshold value $T_H$ or more in order to detect a speech end.

The speech start-speech end detection unit 233 compares the gradient value output by the gradient detection unit 234 to the first gradient threshold value to the third gradient threshold value stored in the storage unit 21A and detects frames f of a speech start and a speech end. Note that, the speech start-speech end detection unit 233 determines that a frame at which the gradient value is the first gradient threshold value or more is a speech start frame and determines that a frame at which the gradient value is the third gradient threshold value or less is a speech end frame. Further, when the gradient value is in the range of the second threshold value, the speech start-speech end detection unit 233 determines that speech is continued. Note that, the speech start-speech end detection unit 233 may detect only a speech continuation.

According to the above process, the speech zone detection unit 23A determines that the discontinuity of a speech zone between frames f11 and f12 shown in FIG. 9 is a sound source continuation and detects that the sound source zone is a zone between frames f1 and f2.

As a result, even according to the present embodiment, as shown in image g202 of FIG. 5, it is possible to detect one speech zone without discontinuity in the speech zone.

<Process Sequence of Speech-Processing System 1A>

Next, a process sequence performed by the speech-processing system 1 of the present embodiment will be described.

Figure 10:
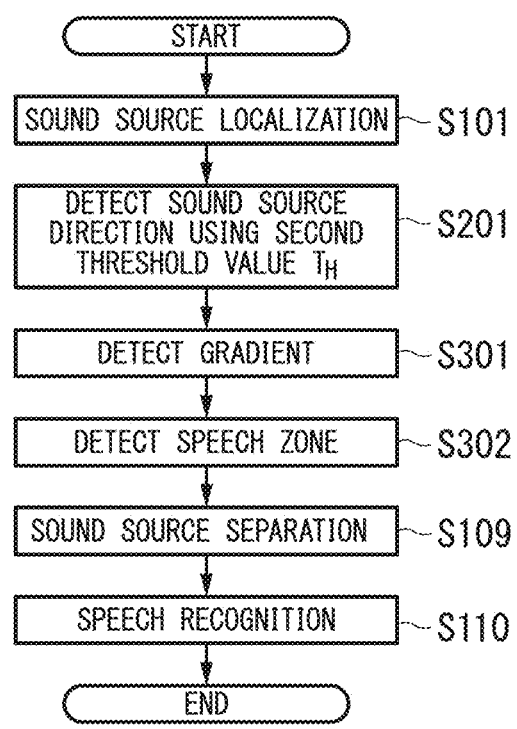
FIG. 10 is a flowchart of a process performed by a speech-processing system according to the third embodiment.

FIG. 10 is a flowchart of a process performed by the speech-processing system 1A according to the present embodiment. Note that, the same reference numeral is used for the same process as those in FIG. 4 and FIG. 6, and the description thereof is omitted.

(Step S301) After the process of step S201 is completed, the gradient detection unit 234 detects a gradient in a zone including a sound source candidate detected by using the second threshold value $T_H$. The gradient detection unit 234 advances the process to step S302.

(Step S302) The speech start-speech end detection unit 233 compares the gradient value output by the gradient detection unit 234 to the first gradient threshold value to the third gradient threshold value stored in the storage unit 21A and detects frames f of a speech start and a speech end. The speech start-speech end detection unit 233 advances the process to step S109.

As described above, in the speech-processing apparatus 2A of the present embodiment, the speech zone detection unit 23A performs speech zone detection based on a gradient of a spatial spectrum of a speech signal localized by the sound source localization unit 22.

According to this configuration, since a speech zone of the detected sound source candidate is detected by using a gradient of a spatial spectrum after detection using the second threshold value $T_H$, it is possible to reduce an insertion error and discontinuity of a speech zone when detecting a speech zone.

Further, according to the present embodiment, speech zone detection is performed based on a spatial spectrum gradient of a speech signal localized by the sound source localization unit 22, and therefore, it is possible to perform speech zone detection further in accordance with an actual conversation state.

Note that, even in the present embodiment, the speech zone detection unit 23A may include the clustering unit 232. In this case, the gradient detection unit 234 may detect a gradient in a range classified into clusters by the clustering unit 232.

[Fourth Embodiment]

The third embodiment is described using an example in which a speech continuation is determined based on a gradient of a spatial spectrum calculated by the sound source localization unit 22 to thereby prevent discontinuity of a speech zone. The present embodiment is described using an example in which discontinuity of a speech zone is prevented by using a result of sound source localization.

Figure 11:
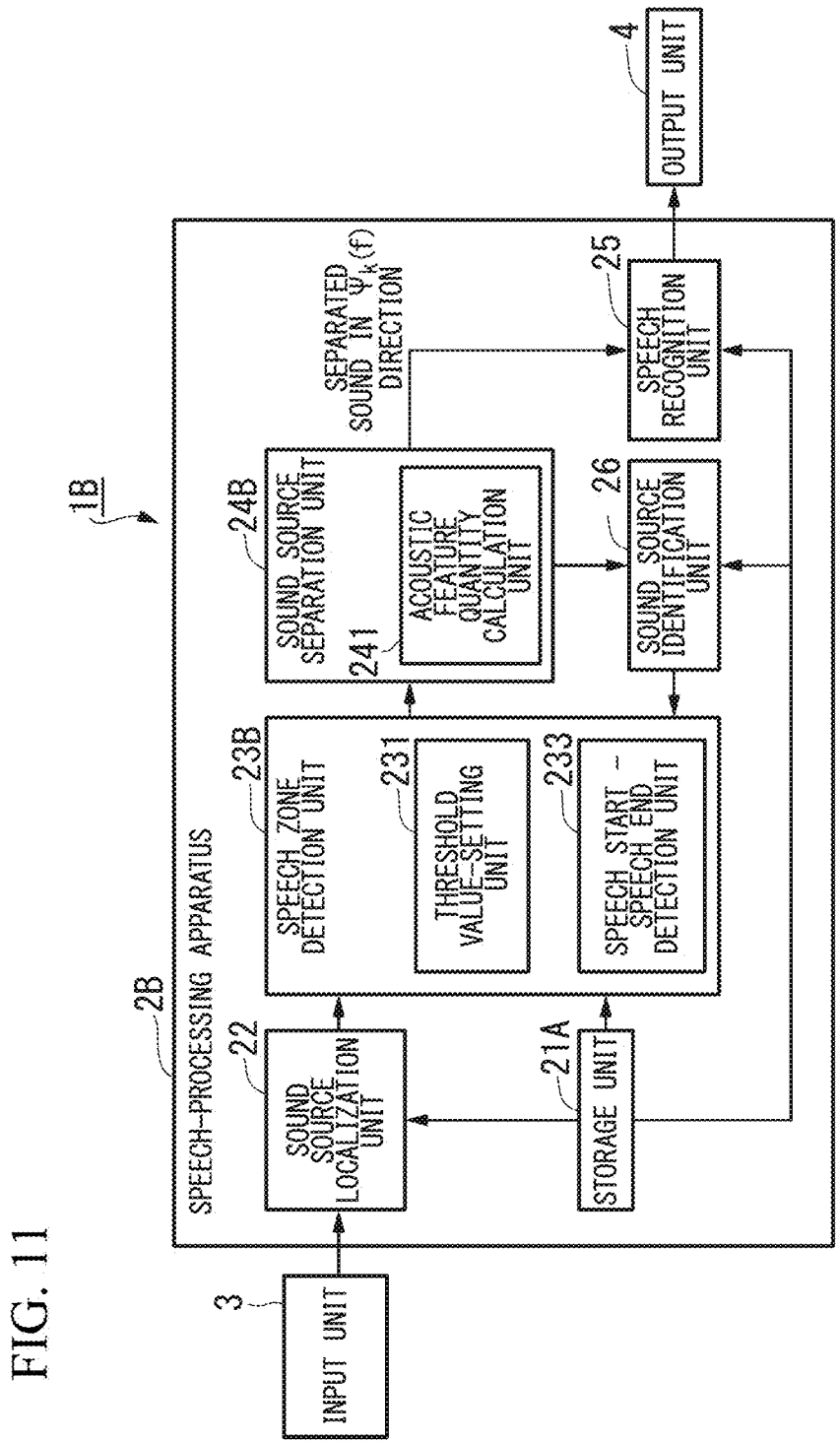
FIG. 11 is a block diagram showing a configuration of a speech-processing system according to a fourth embodiment.

FIG. 11 is a block diagram showing a configuration of a speech-processing system 1B according to the present embodiment. Note that, the same reference numeral is used for a function unit having the same function as the speech-processing systems 1 and 1A, and the description thereof is omitted.

As shown in FIG. 11, a speech-processing apparatus 2B includes the storage unit 21A, the sound source localization unit 22, a speech zone detection unit 23B, a sound source separation unit 24B, the speech recognition unit 25, and a sound source identification unit 26. The difference of the speech-processing system 1B from the speech-processing system 1A is the speech zone detection unit 23B, the sound source separation unit 24B, and the sound source identification unit 26 of the speech-processing apparatus 2B.

The speech zone detection unit 23B includes the threshold value-setting unit 231 and the speech start-speech end detection unit 233.

The speech zone detection unit 23B detects a sound source candidate by using the second threshold value $T_H$ set by the threshold value-setting unit 231. When a speech zone is discontinued, the speech start-speech end detection unit 233 determines whether or not the speech is continued based on an identification result identified by the sound source identification unit 26. The speech start-speech end detection unit 233 detects a frame at which speech is started and a frame at which speech is ended to thereby detect a speech zone. Note that, detection of a speech zone is described below. The speech zone detection unit 23B extracts sound source direction information in the detected speech zone from the input sound source direction information and extracts an M channel speech signal in the detected speech zone from the input M channel speech signal. The speech zone detection unit 23B outputs the extracted sound source direction information φk(f) in the speech zone and the extracted M channel speech signal in the speech zone to the sound source separation unit 24B.

The sound source separation unit 24B includes an acoustic feature quantity calculation unit 241.

The acoustic feature quantity calculation unit 241 calculates a speech feature quantity for each frame having a predetermined length for the sound source-specific speech signals of the sound sources separated by the sound source separation unit 24B. The speech feature quantity is, for example, mel-frequency cepstrum coefficients (MFCC), a mel-frequency log spectrum (MFLS), and the like. The acoustic feature quantity calculation unit 241 outputs the calculated acoustic feature quantity $X_k(f)$ to the sound source identification unit 26 for each frame.

The sound source identification unit 26 determines whether the signal is a speech signal or is a non-speech signal (including noise) based on the acoustic feature quantity $X_k(f)$ output by the acoustic feature quantity calculation unit 241 and outputs the determination result as an identification result to the speech zone detection unit 23B. Note that, the determination method between a speech signal and a non-speech signal by the sound source identification unit 26 is described below.

<Sound Source Identification>

Here, a process performed by the sound source identification unit 26 will be described.

The sound source identification unit 26 performs sound source identification by using, for example, a Gaussian mixture model (GMM), which is a language model stored in the storage unit 21A.

The GMM is a type of acoustic models for obtaining an output probability for an input speech feature quantity by a weighted addition using a plurality of normal distributions as bases. Model variables of the GMM include a mixture weight coefficient $C_{im}$, a mean value $[\mu_{im}]$, and a covariance matrix $[\Sigma_{ip}]$. Here, p represents each base, and i represents a speech state at the time point. The model valuable is given for each class. The likelihood is calculated by an accumulation of output probabilities of the frames. The accumulation includes both a sequential multiplication in a linear domain and a sequential addition in a log domain. In the calculation of likelihood, the sound source identification unit 26 may normalize the accumulated output probabilities by the number of frames according to the accumulation of the output probabilities.

The sound source identification unit 26 calculates a likelihood $p(X_k(f)|\lambda_n)$ of the n-th (n is an integer equal to or greater than 1 and equal to or less than N, N is the maximum number of frames) class. Note that, λ is an acoustic model. Further, a case where n=1 represents speech, and a case where n=2 is non-speech. The sound source identification unit 26 determines that a frame in which a first likelihood $p(X_k(f)|\lambda_1)$ is higher than a second likelihood $p(X_k(f)|\lambda_2)$ is a speech frame. Alternatively, the sound source identification unit 26 determines that a frame in which the first likelihood $p(X_k(f)|\lambda_1)$ is equal to or less than the second likelihood $p(X_k(f)|\lambda_2)$ is a non-speech frame.

Note that, the sound source identification unit 26 may count the number of first likelihoods $p(X_k(f)|\lambda_1)$ and the number of second likelihoods $p(X_k(f)|\lambda_2)$, determine that a zone represents speech when the ratio of the number counted for the first likelihood $p(X_k(f)|\lambda_1)$ exceeds a predetermined ratio (for example, 0.5), and determine that a zone is represents non-speech when the ratio of the counted number does not exceed the predetermined ratio.

Figure 12:
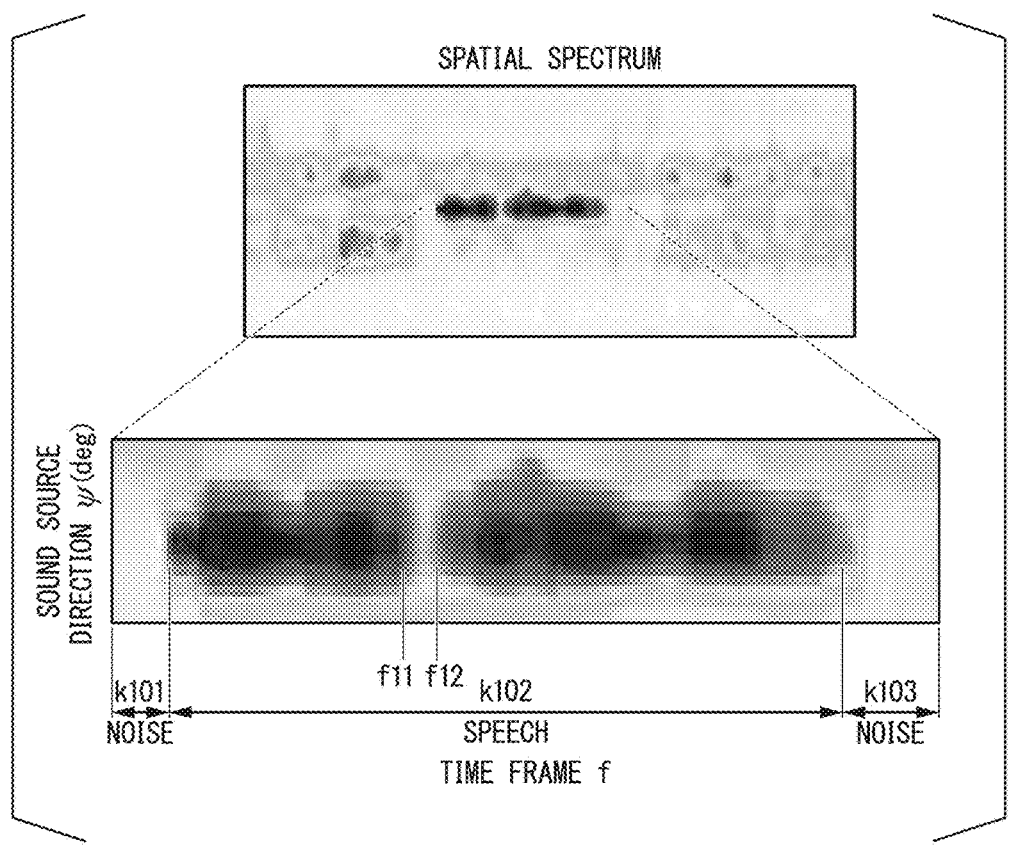
FIG. 12 is a view showing an example of speech and non-speech according to the fourth embodiment.

FIG. 12 is a view showing an example of speech and non-speech according to the present embodiment. In FIG. 12, the vertical axis represents sound source direction φ [deg], and the horizontal axis represents time frame f.

As shown in FIG. 12, a zone k101 and a zone k103 are identified as noise (non-speech) by sound source identification, and a zone between frames f11 and f12 is identified as speech. As a result, a zone k102 is identified as speech. The zone k102 is a speech zone. Note that, the speech zone detection unit 23B may output speech of the second threshold value $T_H$ or more and also speech signals before and after the speech of the second threshold value $T_H$ or more to the sound source separation unit 24B. In this case, the sound source identification unit 26 may perform sound source identification also with respect to the signals before and after the speech zone. Thereby, it is possible to detect a speech zone with high accuracy.

<Speech Zone Detection>

Next, a speech zone detection method will be described.

First, the speech start-speech end detection unit 233 detects a frame at which speech is started (hereinafter, also referred to as a speech start frame) based on a sound source candidate detected by using the second threshold value $T_H$. The speech start-speech end detection unit 233 confirms whether a sound source candidate is present also after the speech start frame. In a case of a discontinued zone, that is, when a sound source candidate is not present, the speech start-speech end detection unit 233 determines whether the identification result output by the sound source identification unit 26 represents speech or represents non-speech. The speech start-speech end detection unit 233 determines that speech is continued (speech continuation) when the identification result represents speech. Further, the speech start-speech end detection unit 233 determines that speech is ended (speech disappearance) when the identification result represents non-speech.

<Process Sequence of Speech-Processing System 1B>

Next, a process sequence performed by the speech-processing system 1B of the present embodiment will be described.

Figure 13:
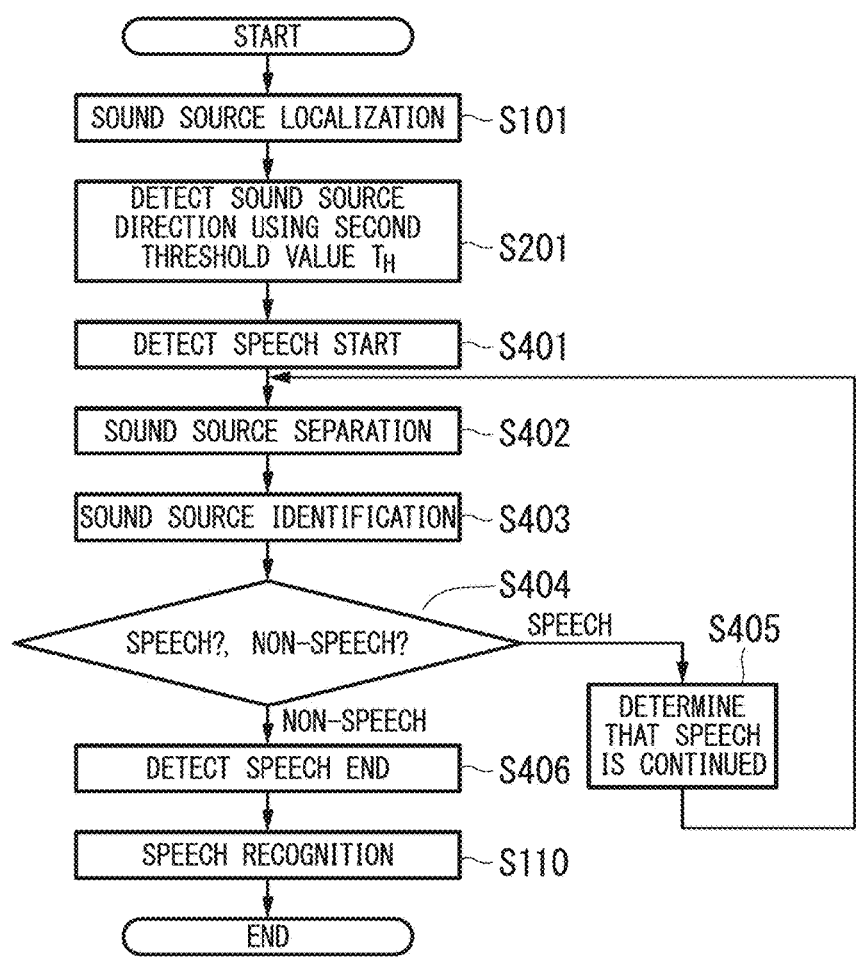
FIG. 13 is a flowchart of a process performed by a speech-processing system according to the fourth embodiment.

FIG. 13 is a flowchart of a process performed by the speech-processing system 1B according to the present embodiment. Note that, the same reference numeral is used for the same process as those in FIG. 4, FIG. 6, and FIG. 10, and the description thereof is omitted.

(Step S401) After the process of step S201 is completed, the speech start-speech end detection unit 233 detects a frame fat which speech is started by using a sound source candidate detected by using the second threshold value $T_H$.

(Step S402) The sound source separation unit 24 separates the M channel speech signal into sound source-specific speech signals as a speech signal of each sound source based on the sound source directions indicated by the sound source direction information. Subsequently, the acoustic feature quantity calculation unit 241 calculates a speech feature quantity for each frame having a predetermined length for the sound source-specific speech signals of the sound sources separated by the sound source separation unit 24B.

(Step S403) The sound source identification unit 26 determines whether the signal is a speech signal or is a non-speech signal (including noise) based on the acoustic feature quantity $X_k(f)$ output by the acoustic feature quantity calculation unit 241 to perform sound source identification.

(Step S404) The speech start-speech end detection unit 233 determines whether the identification result output by the sound source identification unit 26 represents speech or represents non-speech. The speech start-speech end detection unit 233 advances the process to step 405 when it is determined that the identification result represents speech (step S404; speech) and advances the process to step S406 when it is determined that the identification result represents non-speech (step S404; non-speech).

(Step S405) The speech start-speech end detection unit 233 confirms whether a sound source candidate is present also after the speech start frame detected in step S401. When a sound source candidate is not present and when the identification result output by the sound source identification unit 26 represents speech, the speech start-speech end detection unit 233 determines that speech is continued. The speech start-speech end detection unit 233 brings the process back to step S402.

(Step S406) The speech start-speech end detection unit 233 confirms whether a sound source candidate is present also after the speech start frame detected in step S401. When a sound source candidate is not present and when the identification result output by the sound source identification unit 26 represents non-speech, the speech start-speech end detection unit 233 determines that speech is ended. The speech start-speech end detection unit 233 advances the process to step S110.

As described above, the speech-processing apparatus 2B of the present embodiment includes the sound source separation unit 24B that performs sound source separation based on the acquired speech signal and the sound source identification unit 26 that performs sound source identification based on a separation signal separated by the sound source separation unit, and when the result identified by the sound source identification unit is speech for a zone, the speech zone detection unit 23B detects that the zone is a zone in which speech is continued.

This configuration provides an advantage that it is possible to further improve the detection accuracy of a speech zone by using sound source identification.

[Fifth Embodiment]

In the present embodiment, after a sound source candidate is detected by the speech zone detection unit by using a threshold value, in response to event information acquired externally, a mask is applied to a zone where an event occurs to detect a speech zone. Note that, examples of the event include a self-speech by a robot and operations of units of a vehicle (open and close of a power window, open and close of a door, and the like).

Figure 14:
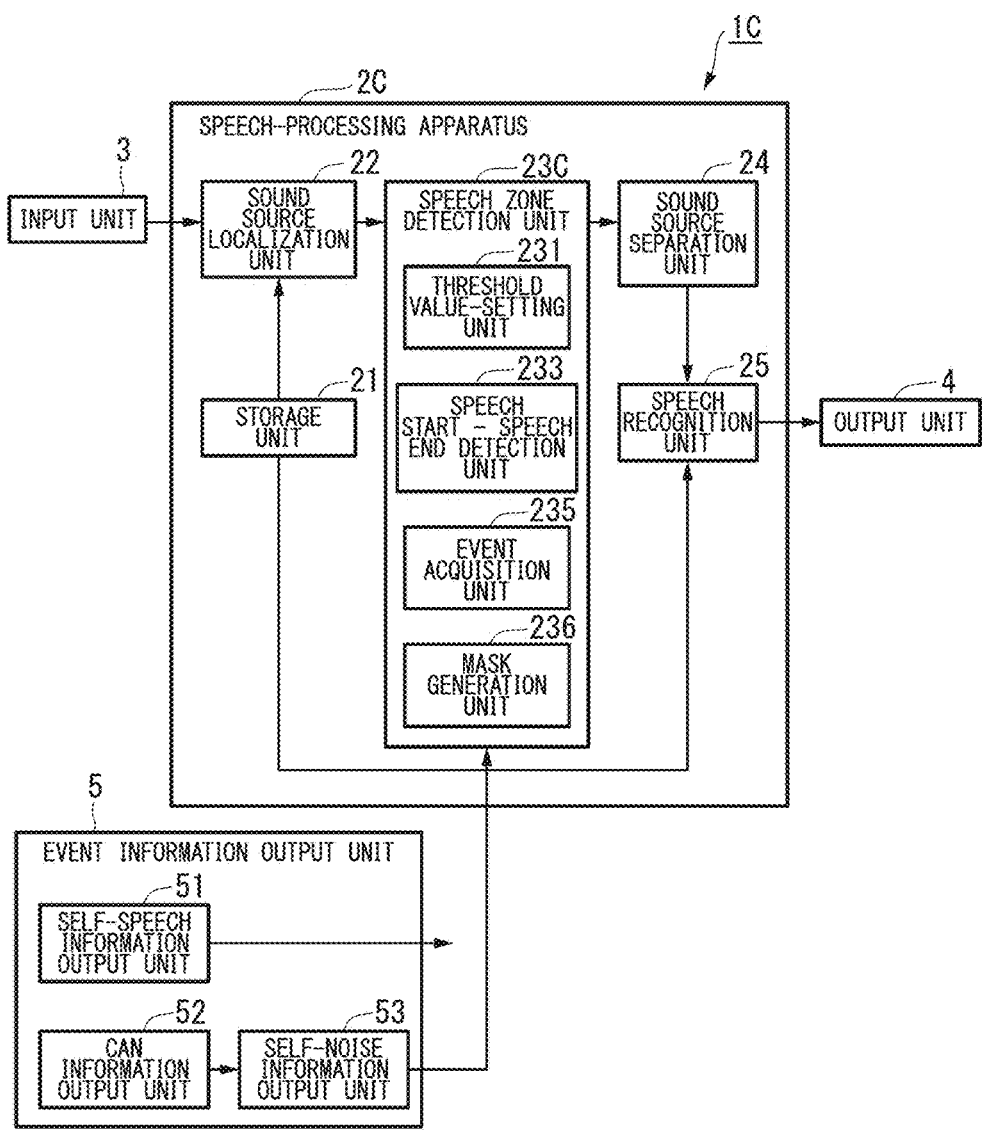
FIG. 14 is a block diagram showing a configuration of a speech-processing system according to a fifth embodiment.

FIG. 14 is a block diagram showing a configuration of a speech-processing system 1C according to the present embodiment. Note that, the same reference numeral is used for a function unit having the same function as the speech-processing system 1, and the description thereof is omitted.

As shown in FIG. 14, a speech-processing apparatus 2C includes the storage unit 21, the sound source localization unit 22, a speech zone detection unit 23C, the sound source separation unit 24, and the speech recognition unit 25. The difference of the speech-processing system 1C from the speech-processing system 1 is the speech zone detection unit 23C of the speech-processing apparatus 2C. Further, an event information output unit 5 is connected to the speech-processing apparatus 2C.

First, the event information output unit 5 will be described.

The event information output unit 5 includes a self-speech information output unit 51, a CAN information output unit 52, and a self-noise information output unit 53.

When a robot (not shown) speeches by itself, the self-speech information output unit 51 outputs event zone information indicating a zone in which the robot speeches by itself to the speech-processing apparatus 2C.

The CAN information output unit 52 outputs CAN (controller area network) information of the vehicle to the self-noise information output unit 53.

The self-noise information output unit 53 outputs to the speech-processing apparatus 2C information indicating a zone in which noise occurs based on the CAN information output by the CAN information output unit 52.

Note that, synchronization of timing is performed between the speech-processing apparatus 2C and the event information output unit 5. For example, a reference clock used in the speech-processing apparatus 2C is output to the event information output unit 5 to share the reference clock, and thereby, synchronization of timing is performed. Further, the event zone information is output, for example, for each frame.

Further, the present embodiment is described using an example of self-speech by a robot and noise occurred by a vehicle; however, the embodiment is not limited thereto. The event information output unit 5 outputs to the speech-processing apparatus 2C event zone information indicating a zone in which a sound that will be noise upon performing speech recognition occurs.

Next, the speech-processing apparatus 2C will be described.

The speech zone detection unit 23C includes the threshold value-setting unit 231, the speech start-speech end detection unit 233, an event acquisition unit 235, and a mask generation unit 236.

The speech zone detection unit 23C detects a sound source candidate by using a threshold value $T_{th}$ (for example, the first threshold value $T_L$) set by the threshold value-setting unit 231. The event acquisition unit 235 acquires event zone information output by the event information output unit 5 and outputs the acquired event zone information to the mask generation unit 236. The mask generation unit 236 generates a mask to be used when detecting a speech zone by using the event zone information output by the event acquisition unit 235. Note that, the mask is described below. The speech start-speech end detection unit 233 detects a speech start frame and a speech end frame by using the detected sound source candidate and the mask. The speech zone detection unit 23C extracts sound source direction information in the detected speech zone from the input sound source direction information and extracts an M channel speech signal in the detected speech zone from the input M channel speech signal. The speech zone detection unit 23C outputs the extracted sound source direction information $\varphi k(f)$ in the speech zone and the extracted M channel speech signal in the speech zone to the sound source separation unit 24.

Note that, the threshold value $T_{th}$ may be at least one of the plurality of threshold values (for example, the first threshold value $T_L$, the second threshold value $T_H$) stored in the threshold value-setting unit 231 in advance.

<Event Zone Information>

Next, an example of event zone information will be described.

Figure 15:
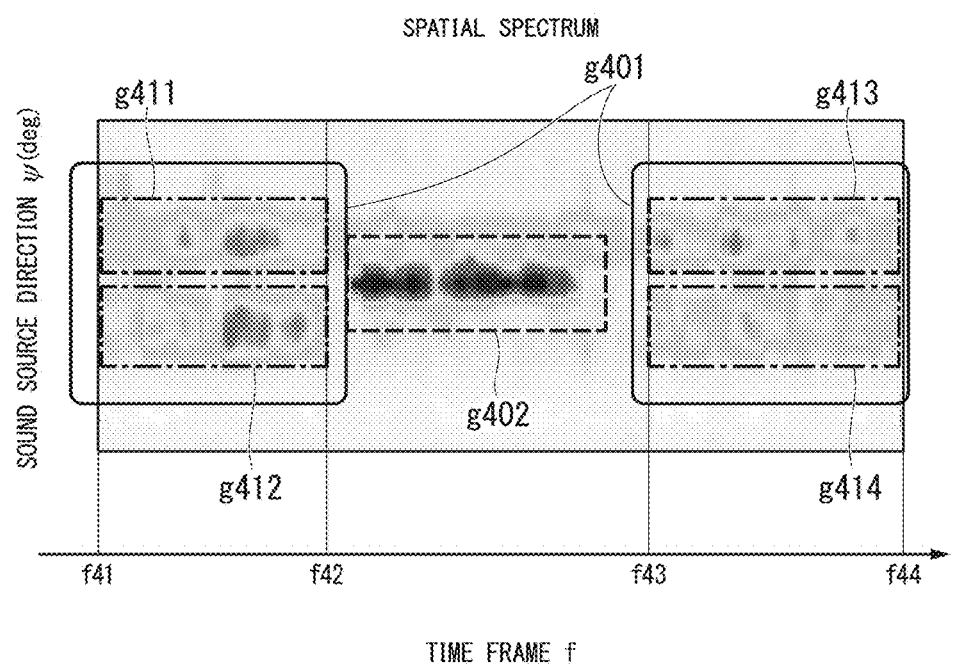
FIG. 15 is a view showing an example of an event zone in a spatial spectrum.

FIG. 15 is a view showing an example of an event zone in a spatial spectrum. In FIG. 15, the vertical axis represents sound source direction $\varphi$ [deg], and the horizontal axis represents time frame f.

In FIG. 15, a region g401 surrounded by a chain line in a square shape represents a region in which a spatial spectrum is affected by external noise. Further, a region g402 surrounded by a chain line in a square shape represents a speech region.

<Mask>

Next, an example of a mask generated by the mask generation unit 236 is described with reference to FIG. 15.

In FIG. 15, each one of regions g411 to g414 surrounded by a chain line in a square shape is an example of a mask generated by the mask generation unit 236.

The mask generation unit 236 determines that at an event occurs (noise occurs) at a zone between frames f41 and f42 and at a zone between frames f43 and f44 in the sound source candidate (spatial spectrum of the threshold value $T_{th}$ or more) based on the event zone information. Next, the mask generation unit 236 classifies the sound source candidate in a zone where the event occurs into clusters, for example, by using a hierarchical clustering method, a partitioning-optimization clustering method, and the like. Next, the mask generation unit 236 generates a mask based on the classified clusters.

<Speech Zone Detection>

Next, speech zone detection will be described.

Figure 16:
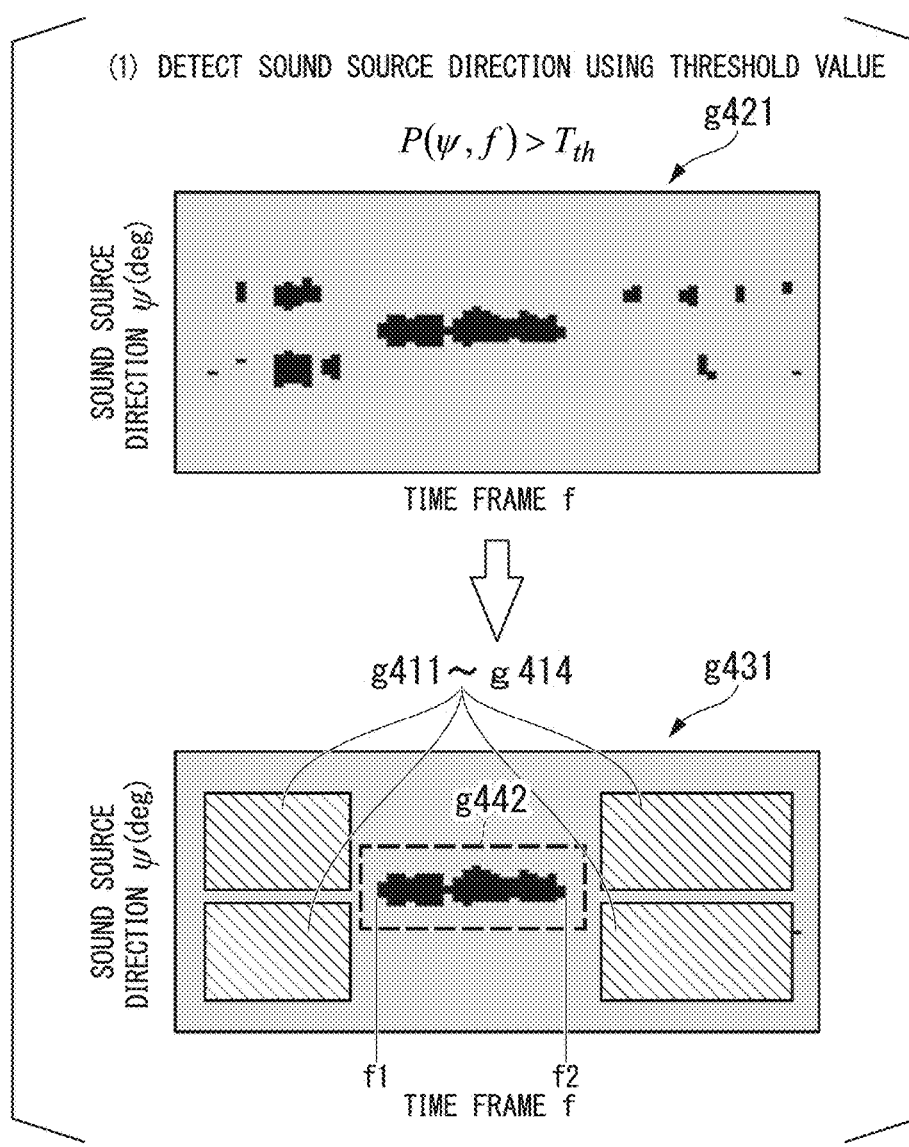
FIG. 16 is a view showing a speech zone detection method according to the fifth embodiment.

FIG. 16 is a view showing a speech zone detection method according to the present embodiment. In FIG. 16, the vertical axis represents sound source direction $\varphi$ [deg], and the horizontal axis represents time frame f.

First, the threshold value-setting unit 231 sets a threshold value $T_{th}$ for detecting a speech zone. Next, the speech zone detection unit 23C detects a zone in which the power of the spatial spectrum is higher than a predetermined power threshold value as a sound source candidate for each sound source with respect to sound source directions indicated by the sound source direction information by using the threshold value $T_{th}$ set by the threshold value-setting unit 231. Image g421 of FIG. 16 is an image showing an example of a sound source candidate detected by using the threshold value $T_{th}$.

The speech start-speech end detection unit 233 applies masks g411 to g414 generated by the mask generation unit 236 to the sound source candidate detected by using the threshold value $T_{th}$ as shown in image g431 of FIG. 16. In the region in which a sound source candidate to which the masks g411 to g414 are not applied is present, the speech start-speech end detection unit 233 detects a frame f1 having the smallest value as a speech start frame and detects a frame f2 having the largest value as a speech end frame.

The speech zone detection unit 23C detects a speech zone (between frames f1 and f2) by using the speech start frame and the speech end frame detected by the speech start-speech end detection unit 233.

Image g431 of FIG. 16 is an image showing an example of the masks g411 to g414 and a sound source candidate g442 based on speech. Note that, the region g442 surrounded by a chain line in a square shape represents a sound source candidate based on speech.

<Process Sequence of Speech-Processing System 1C>

Next, a process sequence performed by the speech-processing system 1C will be described.

Figure 17:
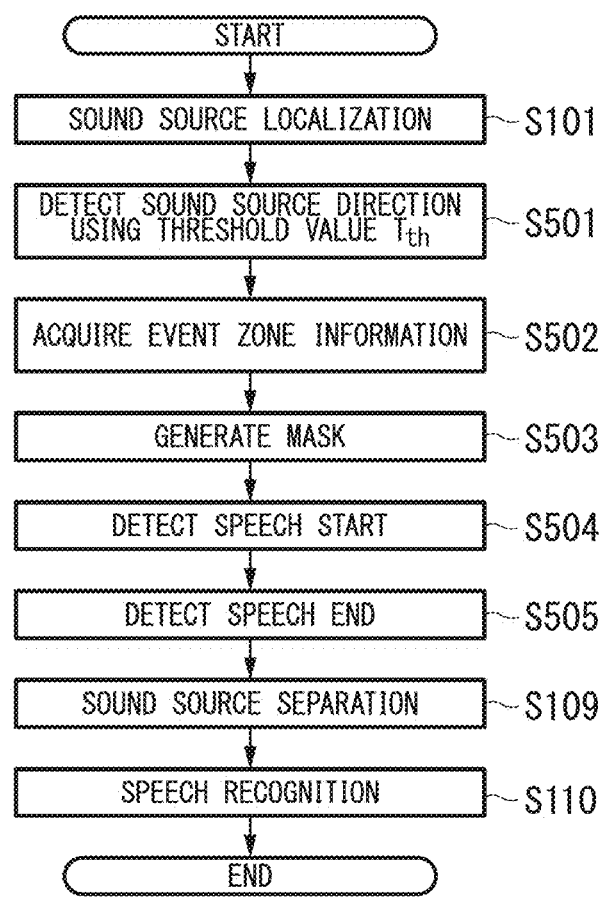
FIG. 17 is a flowchart of a process performed by the speech-processing system according to the fifth embodiment.

FIG. 17 is a flowchart of a process performed by the speech-processing system 1C according to the present embodiment. Note that, the same reference numeral is used for the same process as those shown in FIG. 4, FIG. 6, FIG. 10, and FIG. 13, and the description thereof is omitted.

(Step S501) After the process of step S101 (FIG. 4) is completed, the threshold value-setting unit 231 sets a threshold value $T_{th}$ for detecting a speech zone. Subsequently, the speech zone detection unit 23C detects a zone in which the power of the spatial spectrum is higher than a predetermined power threshold value as a sound source candidate for each sound source with respect to sound source directions indicated by the sound source direction information by using the threshold value $T_{th}$ set by the threshold value-setting unit 231. The threshold value-setting unit 231 advances the process to step S502.

(Step S502) The event acquisition unit 235 acquires event zone information output by the event information output unit 5.

(Step S503) The mask generation unit 236 generates a mask to be used when detecting a speech zone by using the event zone information output by the event acquisition unit 235.

(Step S504) The speech start-speech end detection unit 233 applies a mask generated by the mask generation unit 236 to the sound source candidate detected by using the threshold value $T_{th}$. Subsequently, the speech start-speech end detection unit 233 detects, in the region in which a sound source candidate to which the mask is not applied is present, a frame having the smallest value as a speech start frame.

(Step S505) The speech start-speech end detection unit 233 detects a frame having the largest value as a speech end frame. Subsequently, the speech zone detection unit 23C detects a speech zone by using the speech start frame and the speech end frame detected by the speech start-speech end detection unit 233. The speech zone detection unit 23C advances the process to step S109.

As described above, in the speech-processing apparatus 2C of the present embodiment, the speech zone detection unit 23C detects a sound source candidate by using a threshold value $T_{th}$ with respect to a speech signal localized by the sound source localization unit 22, acquires event information (event zone information) indicating that an event which causes noise with respect to the speech signal is occurring, generates a mask (for example, masks g411 to g414 of FIG. 15) for a sound source candidate detected by using the threshold value based on the acquired event information, and detects a speech zone by using the mask generated for the sound source candidate.

According to this configuration, a mask generated based on event information acquired from an external apparatus is applied to a sound source candidate of a spatial spectrum, and thereby, it is possible to detect a speech zone with high accuracy. That is, in the present embodiment, a sound source candidate is detected by using a small first threshold value $T_L$, for example, similarly to the second embodiment. In this case, the detected sound source candidate also includes an insertion error as shown in image g151 of FIG. 3. In the present embodiment, the insertion errors are rejected further by using a mask. Further, the threshold value used in the present embodiment can be preferably a value that does not cause discontinuity of a speech zone. Therefore, for example, the first threshold value $T_L$ is used as the threshold value $T_{th}$, and thereby, it is possible to prevent discontinuity of a speech zone.

That is, even in the present embodiment, it is possible to prevent an insertion error and discontinuity of a speech zone.

Note that, a process such as sound source localization, speech zone detection, sound source separation, sound source identification, and speech recognition may be performed by recording a program for realizing the functions of the speech-processing apparatuses 2, 2A, 2B, or 2C according to the invention on a non-transitory computer-readable recording medium, reading the program recorded on the recording medium into a computer system, and executing the program. Here, the "computer system" may include an OS or hardware such as peripherals. The "computer system" may include a WWW system including a homepage providing environment (or display environment). Examples of the "computer-readable recording medium" include portable mediums such as a flexible disk, a magneto-optical disk, a ROM, and a CD-ROM and a storage device such as a hard disk built in a computer system. The "computer-readable non-transitory recording medium" may include a medium that temporarily holds a program for a predetermined time, such as a volatile memory (RAM) in a computer system serving as a server or a client in a case where the program is transmitted via a network such as the Internet or a communication circuit such as a telephone circuit.

The program may be transmitted from a computer system storing the program in a storage device or the like to another computer system via a transmission medium or by transmission waves in the transmission medium. Here, the "transmission medium" via which the program is transmitted means a medium having a function of transmitting information such as a network (communication network) such as the Internet or a communication circuit (communication line) such as a telephone line. The program may be configured to realize part of the above-mentioned functions. Further, the program may be configured to realize the above-mentioned functions by combination with a program recorded in advance in a computer system, such as a so-called differential file (differential program).

While embodiments of the invention have been described and shown in the drawings, it should be understood that the present invention is not limited to the above embodiments, and additions, omissions, substitutions, and other modifications of the configuration can be made without departing from the scope of the present invention. Accordingly, the invention is not to be considered as being limited by the foregoing description, and is only limited by the scope of the appended claims.

The invention claimed is:

1. A speech-processing apparatus, comprising:
a processor configured to:
localize a sound source based on an acquired speech signal; and
perform speech zone detection in which a speech start and a speech end are detected based on localization information of the localized sound source,
wherein the processor is configured to perform the speech zone detection by using a plurality of threshold values with respect to the localized speech signal, and wherein the processor is configured to:
detect a sound source candidate by using a first threshold value of the plurality of threshold values with respect to the localized speech signal,
perform a clustering process on the detected sound source candidate, and perform the speech zone detection in which a speech start and a speech end are detected, by using a second threshold value that is larger than the first threshold value of the plurality of threshold values for each cluster classified by the clustering process.

2. The speech-processing apparatus according to claim 1, wherein the processor is configured to:
detect a sound source candidate by using a second threshold value of the plurality of threshold values with respect to the localized speech signal,
perform a clustering process on the detected sound source candidate, and
perform the speech zone detection in which a speech start and a speech end are detected, by using a first threshold value that is smaller than the second threshold value of the plurality of threshold values for each cluster classified by the clustering process.

3. The speech-processing apparatus according to claim 1, wherein the processor is configured to perform the speech zone detection in which a speech start and a speech end are detected, based on a gradient of a spatial spectrum of the localized speech signal.

4. The speech-processing apparatus according to claim 1, wherein the processor is configured to:
perform sound source separation based on the acquired speech signal;
perform sound source identification based on the separated separation signal; and
detect, when the identified result is speech, that speech is continued in a zone.

5. The speech-processing apparatus according to claim 1, wherein the processor is configured to:
detect a sound source candidate by using a threshold value with respect to the localized speech signal,
acquire event information indicating that an event which causes noise with respect to the speech signal is occurring,
generate a mask for a sound source candidate detected by using the threshold value based on the acquired event information, and
perform the speech zone detection in which a speech start and a speech end are detected, by using the mask generated for the sound source candidate.

6. A speech-processing method, comprising:
(a) localizing a sound source based on an acquired speech signal;
(b) performing speech zone detection in which a speech start and a speech end are detected based on localization information of the sound source localized in (a); and
(c) performing the speech zone detection by using a plurality of threshold values with respect to the speech signal localized in (a), wherein in (c),
a sound source candidate is detected by using a first threshold value of the plurality of threshold values with respect to the localized speech signal,
a clustering process is performed on the detected sound source candidate, and
the speech zone detection in which a speech start and a speech end are detected is performed by using a second threshold value that is larger than the first threshold value of the plurality of threshold values for each cluster classified by the clustering process.

* * * * *